US012628138B2

(12) United States Patent
Robin et al.

(10) Patent No.: US 12,628,138 B2
(45) Date of Patent: May 12, 2026

(54) PERIODIC ADVERTISEMENT COVERAGE EXTENSION USING BRIDGES

(71) Applicant: QUALCOMM Incorporated, San Diego, CA (US)

(72) Inventors: Robin Robin, Noida (IN); Rahul Sangwan, Charkhi Dadri (IN); Sonu Lnu, Faridabad (IN); Deep Shikha Aggarwal, Gurugram (IN); Randhir Kumar, New Delhi (IN); Nicolas Graube, Cambridge (GB)

(73) Assignee: Qualcomm Incorporated, San Diego, CA (US)

( * ) Notice: Subject to any disclaimer, the term of this patent is extended or adjusted under 35 U.S.C. 154(b) by 534 days.

(21) Appl. No.: 18/326,878

(22) Filed: May 31, 2023

(65) Prior Publication Data

US 2024/0406937 A1     Dec. 5, 2024

(51) Int. Cl.
H04W 72/0446      (2023.01)
H04W 4/80      (2018.01)
H04W 56/00      (2009.01)

(52) U.S. Cl.
CPC .......... H04W 72/0446 (2013.01); H04W 4/80 (2018.02); H04W 56/00 (2013.01)

(58) Field of Classification Search
CPC ... H04W 72/0446; H04W 4/80; H04W 56/00; H04W 56/001; H04W 72/04; H04W 76/10; H04W 84/12
See application file for complete search history.

(56) References Cited

U.S. PATENT DOCUMENTS

2022/0159436 A1     5/2022  Lee et al.
2022/0377517 A1*   11/2022  Altshul ................. H04W 76/11

FOREIGN PATENT DOCUMENTS

KR     20240155682 A   * 10/2024   ............... H04R 3/12

OTHER PUBLICATIONS

Martin W., "Bluetooth Core Specification Version 5.4", Feb. 7, 2023, XP093175129, paragraph [01.2], pp. 1-43. (Year: 2023).*
International Search Report and Written Opinion—PCT/US2024/023932—ISA/EPO—Sep. 5, 2024.
(Continued)

*Primary Examiner* — Austin J Moreau
(74) *Attorney, Agent, or Firm* — Polsinelli LLP

(57)      ABSTRACT

Systems and techniques are provided for wireless communications. For example, a process can include receiving, from a first network entity a request to identify one or more additional network entities available for communication with a wireless communication device. A process can include transmitting, to a second network entity included in the one or more additional network entities, timing information indicative of a difference between first synchronization information associated with the first network entity and second synchronization information associated with the second network entity. A process can include receiving, from the second network entity, subframe allocation information corresponding to periodic advertisements (PAs) between the second network entity and the wireless communication device. A process can include receiving, from the second network entity, a PA based on the subframe allocation information.

30 Claims, 11 Drawing Sheets

(56)                    References Cited

OTHER PUBLICATIONS

Martin W., "Bluetooth Core Specification Version 5.4", Feb. 7, 2023, XP093175129, paragraph [01.2], pp. 1-43.
Martin W., "The Bluetooth Low Energy Primer 1.1.0", Jan. 17, 2023, 79 Pages, XP093099960, paragraph [7.7.3]—paragraph [7.7. 4].

* cited by examiner

100

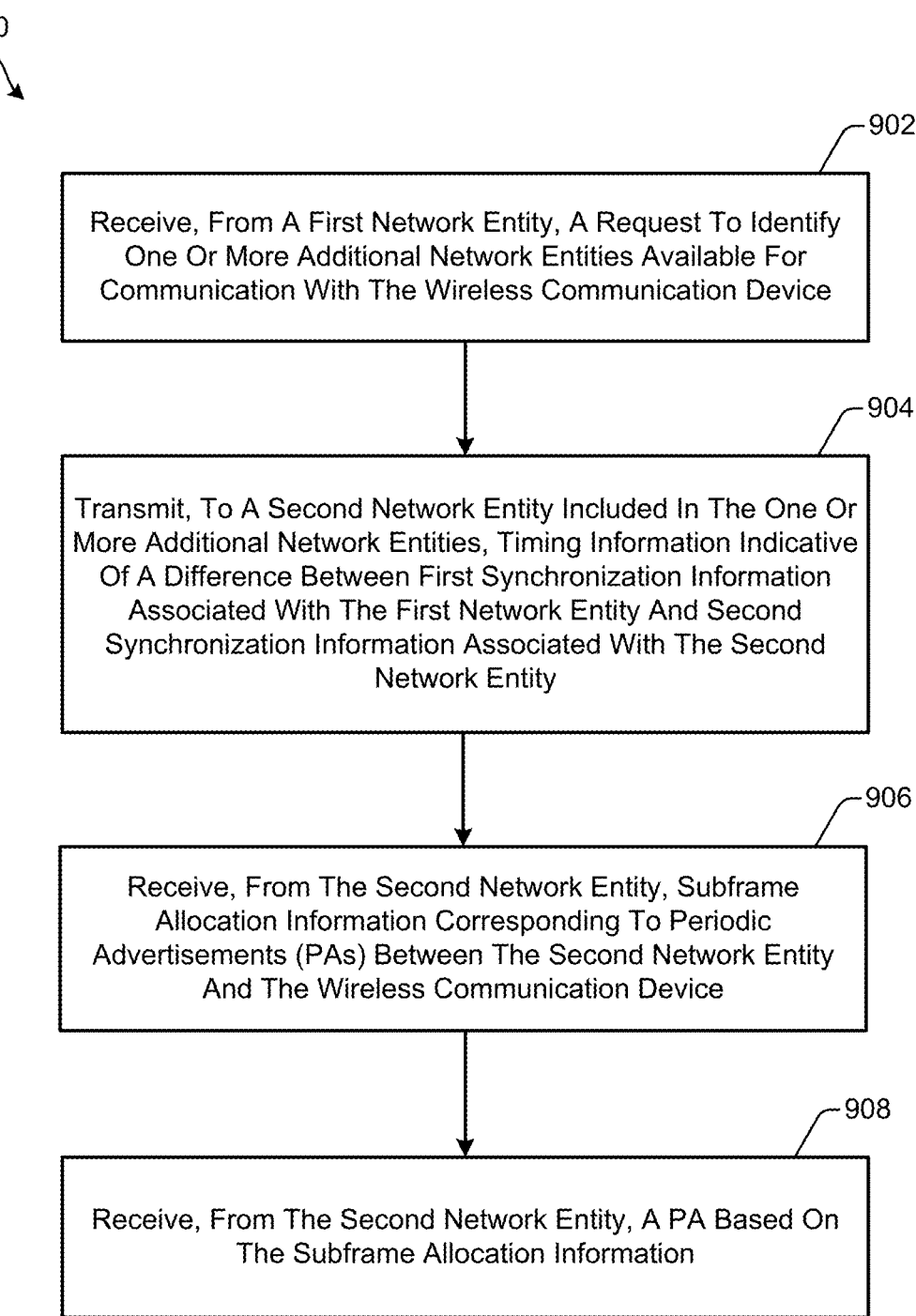

900

902

Receive, From A First Network Entity, A Request To Identify One Or More Additional Network Entities Available For Communication With The Wireless Communication Device

904

Transmit, To A Second Network Entity Included In The One Or More Additional Network Entities, Timing Information Indicative Of A Difference Between First Synchronization Information Associated With The First Network Entity And Second Synchronization Information Associated With The Second Network Entity

906

Receive, From The Second Network Entity, Subframe Allocation Information Corresponding To Periodic Advertisements (PAs) Between The Second Network Entity And The Wireless Communication Device

908

Receive, From The Second Network Entity, A PA Based On The Subframe Allocation Information

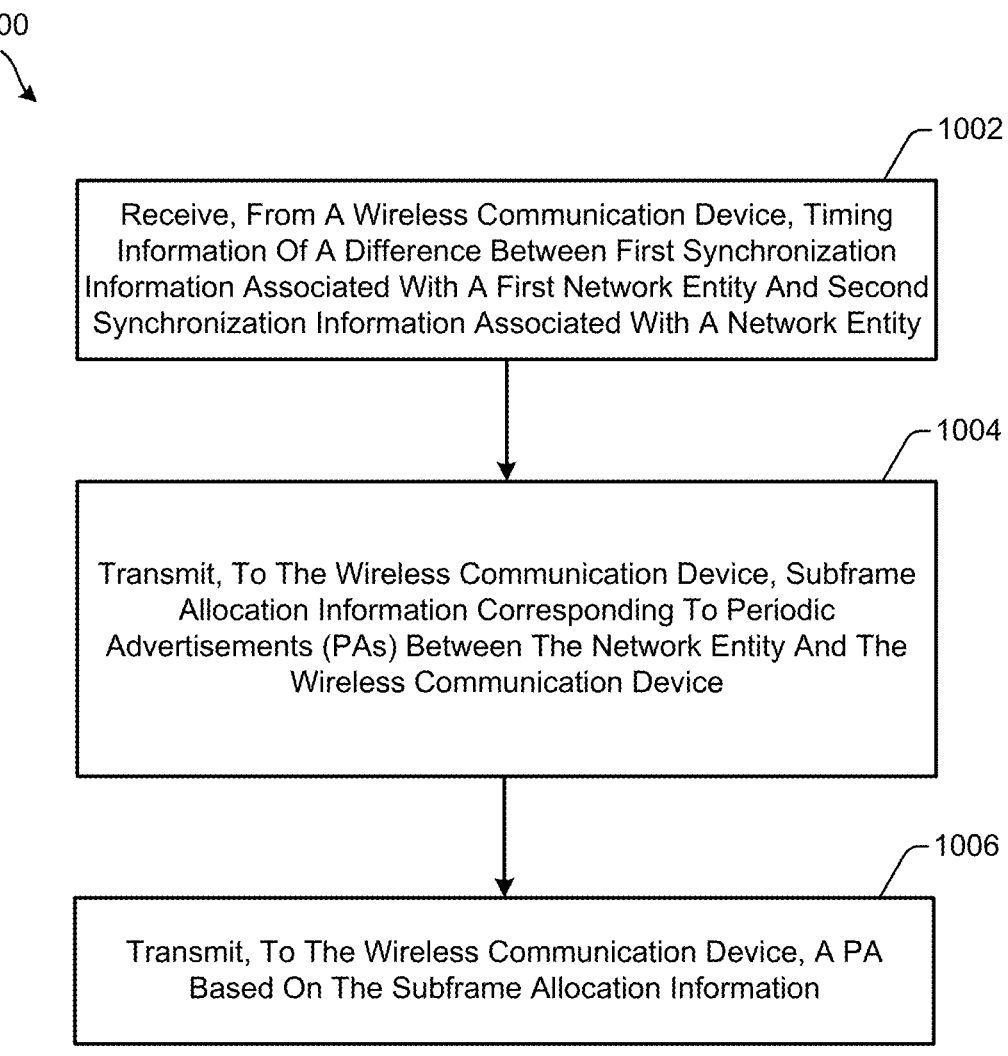

1002

Receive, From A Wireless Communication Device, Timing Information Of A Difference Between First Synchronization Information Associated With A First Network Entity And Second Synchronization Information Associated With A Network Entity

1004

Transmit, To The Wireless Communication Device, Subframe Allocation Information Corresponding To Periodic Advertisements (PAs) Between The Network Entity And The Wireless Communication Device

1006

Transmit, To The Wireless Communication Device, A PA Based On The Subframe Allocation Information

FIG. 10

PERIODIC ADVERTISEMENT COVERAGE EXTENSION USING BRIDGES

FIELD OF THE DISCLOSURE

The present disclosure generally relates to wireless communications. For example, aspects of the present disclosure relate to communication bridging in a synchronization system including one or more network devices (e.g., central devices, such as access points (APs)) and one or more wireless communication devices (e.g., peripheral devices, such as electronic shelf labels (ESLs)).

BACKGROUND OF THE DISCLOSURE

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method for wireless communications by a wireless communication device is provided. The method includes: receiving, from a first network entity, a request to identify one or more additional network entities available for communication with the wireless communication device; transmitting, to a second network entity included in the one or more additional network entities, timing information indicative of a difference between first synchronization information associated with the first network entity and second synchronization information associated with the second network entity; receiving, from the second network entity, subframe allocation information corresponding to periodic advertisements (PAs) between the second network entity and the wireless communication device; and receiving, from the second network entity, a PA based on the subframe allocation information.

In another illustrative example, an apparatus of a wireless communication device for wireless communications is provided. The apparatus includes at least one memory and at least one processor coupled to the at least one memory and configured to: receive, from a first network entity, a request to identify one or more additional network entities available for communication with the wireless communication device; transmit, to a second network entity included in the one or more additional network entities, timing information indicative of a difference between first synchronization information associated with the first network entity and second synchronization information associated with the second network entity; receive, from the second network entity, subframe allocation information corresponding to periodic advertisements (PAs) between the second network entity and the wireless communication device; and receive, from the second network entity, a PA based on the subframe allocation information.

In another illustrative example, a non-transitory computer-readable storage medium comprising instructions stored thereon which, when executed by at least one processor, causes the at least one processor to: receive, from a first network entity, a request to identify one or more additional network entities available for communication with the wireless communication device; transmit, to a second network entity included in the one or more additional network entities, timing information indicative of a difference between first synchronization information associated with the first network entity and second synchronization information associated with the second network entity; receive, from the second network entity, subframe allocation information corresponding to periodic advertisements (PAs) between the second network entity and the wireless communication device; and receive, from the second network entity, a PA based on the subframe allocation information.

In another illustrative example, an apparatus is provided for wireless communications. The apparatus includes: means for receiving, from a first network entity, a request to identify one or more additional network entities available for communication with the wireless communication device; means for transmitting, to a second network entity included in the one or more additional network entities, timing information indicative of a difference between first synchronization information associated with the first network entity and second synchronization information associated with the second network entity; means for receiving, from the second network entity, subframe allocation information corresponding to periodic advertisements (PAs) between the second network entity and the wireless communication device; and means for receiving, from the second network entity, a PA based on the subframe allocation information.

In another illustrative example, a method for wireless communications by a network entity is provided. The method includes: receiving, from a wireless communication device, timing information indicative of a difference between first synchronization information associated with a first network entity and second synchronization information associated with the network entity; transmitting, to the wireless communication device, subframe allocation information corresponding to periodic advertisements (PAs) between the network entity and the wireless communication device; and transmitting, to the wireless communication device, a PA based on the subframe allocation information.

In another illustrative example, an apparatus of a network entity for wireless communications is provided. The apparatus includes at least one memory and at least one processor coupled to the at least one memory and configured to: receive, from a wireless communication device, timing information indicative of a difference between first synchronization information associated with a first network entity and second synchronization information associated with the network entity; transmit, to the wireless communication device, subframe allocation information corresponding to periodic advertisements (PAs) between the network entity and the wireless communication device; and transmit, to the wireless communication device, a PA based on the subframe allocation information.

In another illustrative example, a non-transitory computer-readable storage medium comprising instructions stored thereon which, when executed by at least one processor, causes the at least one processor to: receive, from a wireless communication device, timing information indicative of a difference between first synchronization information associated with a first network entity and second synchronization information associated with the network entity; transmit, to the wireless communication device, subframe allocation information corresponding to periodic advertisements (PAs) between the network entity and the wireless communication device; and transmit, to the wireless communication device, a PA based on the subframe allocation information.

In another illustrative example, an apparatus is provided for wireless communications. The apparatus includes: means for receiving, from a wireless communication device, timing information indicative of a difference between first synchronization information associated with a first network entity and second synchronization information associated with the network entity; means for transmitting, to the wireless communication device, subframe allocation information corresponding to periodic advertisements (PAs) between the network entity and the wireless communication device; and means for transmitting, to the wireless communication device, a PA based on the subframe allocation information.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a flow chart illustrating an example of a process for wireless communications at a wireless communication device, in accordance with some examples;

FIG. 10 is a flow chart illustrating an example of a process for wireless communications at a network entity, in accordance with some examples.

DETAILED DESCRIPTION

Figure 1:
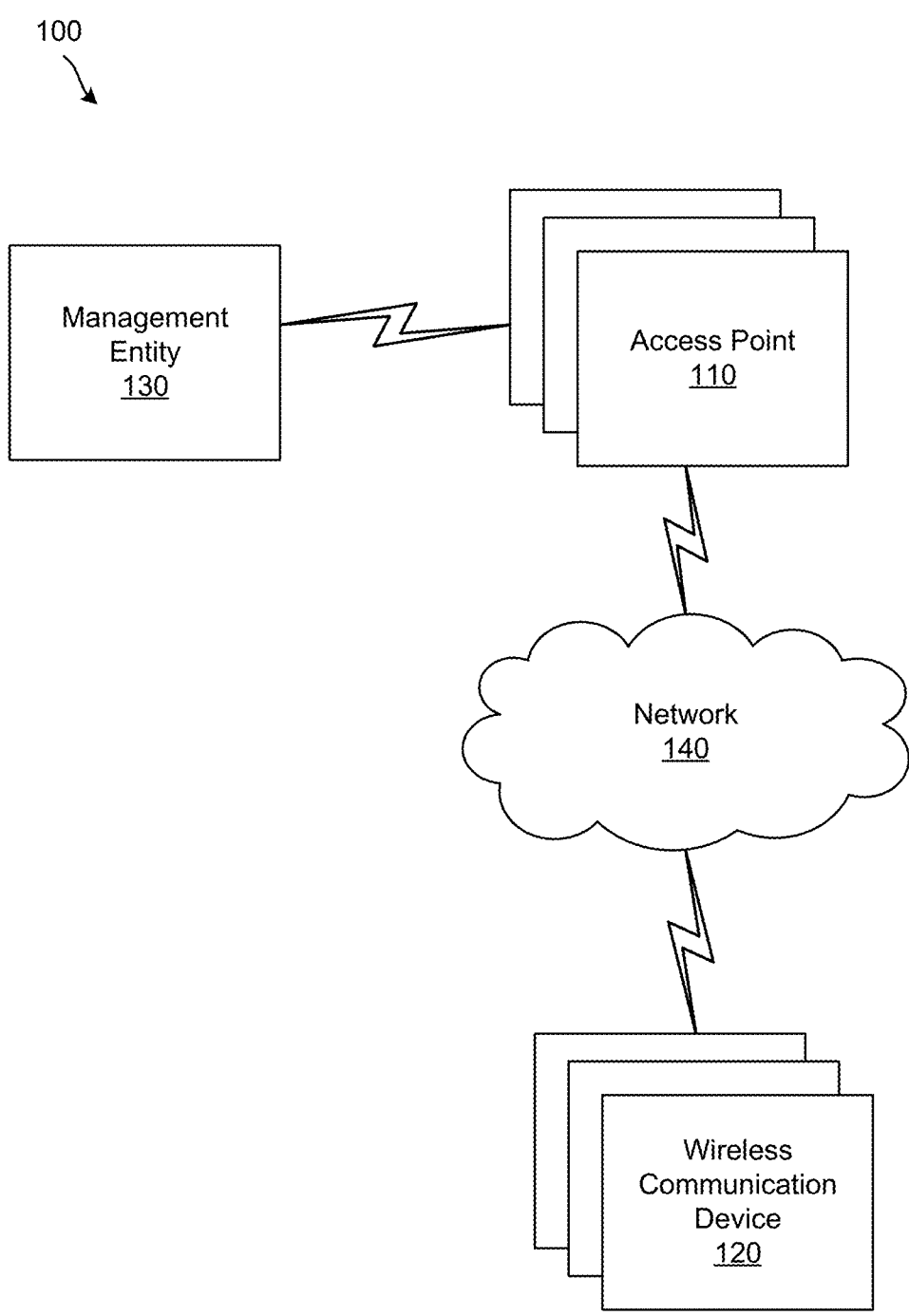
FIG. 1 is a diagram illustrating an example environment in which systems and/or methods described herein may be implemented, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

A system may include one or more wireless communication devices that are controlled by a network entity. For example, a system including multiple peripheral devices (e.g., an electronic shelf label (ESL) system) may include one or more wireless communication devices (e.g., peripheral devices, such as ESLs) that are controlled by a network entity, such as a management entity (ME), via at least one network device, such as an access point (AP). In one or more examples, to facilitate control by the ME, each peripheral device (e.g., ESL) may have a wireless connection (e.g., a BLUETOOTH® Low Energy (BLE) connection or other connection) to AP that is communicatively connected to the ME (e.g., via the Internet, such as wirelessly, via an Ethernet connection, etc.). In some cases, an AP and an ME can be combined in a single device (e.g., a single device can perform the functionalities associated with an AP and the functionalities associated with an ME). In some cases, commands from the ME may be wirelessly transmitted to the peripheral devices (e.g., ESLs) by the AP. Responses or information from the peripheral devices may also be received by the AP and provided by the AP to the ME. Each AP may have an associated channel map. A channel map is a listing of frequency channels to be utilized or, conversely, not to be utilized (e.g., in the context of modification of frequency hopping sequences) by an AP for communication, such as with the ESLs or other peripheral devices. While examples are described herein using ESLs as illustrative examples of wireless communication devices, a management entity as an example of a network entity, and access points as examples of network devices, the systems and techniques described herein are applicable to any type of system or network.

In some examples, ESL systems can be deployed to support and manage ESL devices in stores (e.g., supermarkets) and other retail spaces. In some examples, ESL systems may be deployed to support and manage ESL devices in warehouses (e.g., distribution centers) and other industrial spaces. For instance, in a store, ESLs may be provided as electronic labels that are affixed to store shelves to identify the items and the price of the items located on the store shelf above the label. ESLs may be each implemented with a display (e.g., a liquid crystal display (LCD), an electronic paper (e-paper) display, etc.). The ESL may digitally display the name of the item, a product identification number for the item, such as a stock keeping unit (SKU) number, and a price for the item. The ESL may additionally display a barcode for the item, a quick response (QR) code for the item, and/or an image (e.g., a picture) of the item. In some examples, each ESL may include a display and a radio or wireless transceiver for communicating with one or more APs and/or MEs included in the ESL system. For example, during operation of the ESL system, the information displayed on the ESLs may be updated periodically by using periodic advertisements (PAs), as will be described in greater depth below.

As noted previously, in some examples, ESL systems can additionally, or alternatively, be used to support and manage ESL devices in warehouses (e.g., distributions) and other industrial spaces. For example, in a warehouse or distribution center, ESL devices can be provided as trackers that are attached to pallets or various other shipping containers that are moved throughout the warehouse and/or transported in a supply chain. In some examples, a tracker can be provided as a printed active (e.g., battery-powered) Bluetooth® Low Energy (BLE) label. A BLE tracker can be implemented based on (e.g., can be compliant with) the ESL protocol. For example, a BLE tracker can be attached to a pallet of merchandise and used to track the pallet of merchandise as it moves from a global distribution center (GDC) to a retail store environment.

In ESL systems, periodic advertisements (PAs) can be utilized to provide regular and predictable payload transmissions from a network device (e.g., such as an AP) to one or more wireless communication devices (e.g., such as ESLs). For example, PAs can be used to issue information from a network device to multiple wireless communication devices, which may be within one or more groups of wireless communication devices. PAs are generally unidirectional (e.g., unidirectional transmissions) such that PAs are transmitted only one-way from a network device (e.g., AP) to one or more wireless communication devices (e.g., ESLs). In some examples, the information displayed on the ESLs may be updated periodically by using periodic advertisements (PAs), as noted previously above.

Periodic Advertisement with Response (PAwR) can be used for ESL systems to provide bidirectionality (e.g., bidirectional transmissions between a central device and one or more peripheral devices). Wireless communication devices (e.g., peripheral devices, such as ESLs) synchronized within a group of wireless communication devices can be addressed by a network device (e.g., AP) on a synchronized channel (e.g., a radio frequency (RF) channel between the network device and the wireless communication devices) whenever the network device chooses to send (e.g., transmit on a synchronized subevent) a request to the wireless communication devices. In some cases, as used herein, a synchronized channel refers to a channel on which transmissions are synchronized (in time). For example, the channel can utilize or can be based on a frequency on which one or more communications are transmitted. A hopping frequency sequence can be associated with the channel, where the hopping frequency sequence progresses at a fixed and/or pre-determined interval. A central device (e.g., AP, ME, etc.) and one or more peripheral devices (e.g., ESLs) can concurrently track the hopping frequency sequence at the predefined frequency hopping pattern (e.g., such that the central device knows when to transmit the request and the peripheral devices know when to listen for and/or receive the request).

In some cases, a request transmitted by a central device to peripheral devices in a particular group may be a PA containing a synchronization message transmitted by the central device on the synchronized channel to the peripheral devices of the particular group. For example, an AUX_SYNC_SUBEVENT_IND message can contain an AP Sync command. For example, wireless communication devices (e.g., ESLs) within the particular group can wake up (e.g., from a low power (LP) mode) at the same PA transmission with respect to a particular PAwR train for that group. In some examples, wireless communication devices (e.g., ESLs) can wake up at any sub-frame or group, based on the SigESL protocol. For instance, based on the SigESL protocol, the wireless communication devices (e.g., ESLs) can wake up at a particular sub-frame or group corresponding to the same PA transmission with respect to the particular PAwR train. For instance, ESLs within a particular group can wake up at the same particular sub-frame of a plurality of sub-frames (e.g., a PA frame may include 128 sub-frames, with a sub-interval of 12.5 ms). A PA transmission can include a periodic set of transmissions, which may be collectively referred to as a PA train, or a PAwR train when applied to PAwR. Each transmission of a PA train (or PAwR train) occurs at a precise point in time, with fixed intervals between the transmissions. A communication channel (e.g., one communication channel out of thirty-seven available communication channels) is selected for each of the transmissions, where the communication channel follows a hopping frequency sequence.

The synchronization between the central device and the peripheral devices in the group can be based on the periodicity of the PA. The periodically-transmitted messages (e.g., the synchronization messages) can include zero, one, or more commands (e.g., a respective operational code (Op-Code) and parameters associated with each command). For example, the synchronization messages can include an AUX_SYNC_IND message associated with a PA train and/or can include an AUX_SYNC_SUBEVENT_IND message associated with PAwR for APs/ESLs. If a response from a wireless communication device is expected by the network device (e.g., the synchronization message from the network device requests a response from a specific wireless communication device), the particular wireless communication device can respond in a specific response slot, which may be based on where the wireless communication device appeared within a sequence contained within the synchronization message transmitted by the network device.

In some cases, one or more ESLs may be physically moved to a new location. For example, one or more ESLs may be moved from one location in a retail store (e.g., a particular shelf or a storage area) to a different location in the retail store, to a different retail store location, etc. In some examples, store shelves (e.g., with a plurality of ESLs attached thereto) may be attached to a gondola that allows the moving or repositioning the shelves and the products provided on the shelves. In another example, an ESL that is provided as a tracker (e.g., such as a printed active BLE label) may by physically moved during transportation of a pallet (e.g., to which the tracker is attached) from a distribution center to a retail store location.

As noted above, PAwR can be used to synchronize peripheral devices with a central device. Based on the synchronizing, the peripheral devices can respond to periodic transmissions (e.g., PAs) transmitted by the PAwR central (e.g., the central device). For example, a first set of time slots can be used to transmit the PAs from the central device (or the first set of time slots may be reserved for PA transmission from the central device). A second set of time slots can include time slots that are non-overlapping with (e.g., between) the first set of time slots associated with the PA transmission(s) from the central device. The second set of time slots can be used by the peripheral devices to transmit various responses to messages transmitted by the central device (e.g., responses to the PA transmission(s) from the central device).

Subframe allocation can be performed to join or subscribe a peripheral device to a central device. For example, subframe allocation can be performed during an onboarding procedure between the peripheral device and the central device, in response to a subscription request from the peripheral device to the central device, etc. Subframe allocation can be used to assign the peripheral device to a particular group of devices that communicate with the central device using the same subframe. For instance, a time frame associated with the central device may have a periodicity (e.g., duration) of 1.6 seconds and can be divided into a plurality of subframes (e.g., such as 128 subframes each having a periodicity of 12.5 milliseconds (ms)). A first group of devices can be allocated to a first subframe and may each communicate with the central device (e.g., transmit and/or receive messages) during the first subframe; a second group of devices can be allocated to a second subframe and may each communicate with the central device during the second subframe; etc. In addition to allocating a subframe, the central device may allocate a device ID to each peripheral device. Continuing in the example above, the central device may allocate a peripheral device to one of 128 different groups (e.g., corresponding to the 128 subframes), and may allocate the peripheral device to one of 256 device IDs associated with each group.

In some cases, the central device may perform subframe and device ID allocation based on an allocation sequence basis. The allocation sequence basis may be a fixed or pre-determined allocation sequence. For example, as new peripheral devices are onboarded to the central device, the plurality of different groups (e.g., subframes) and device IDs (e.g., slots within a respective subframe) can be allocated sequentially to the peripheral devices, based on the allocation sequence basis. Sequential subframe and device ID allocation can result in peripheral devices being allocated into subframe groups based on the relative timing of each peripheral device's onboarding or subscription to the central (e.g., the first 256 peripheral devices may be allocated the 256 device IDs of subframe group 1, the next 256 peripheral devices may be allocated the 256 device IDs of subframe group 2, etc.).

The various peripheral devices for which subframe and device ID allocation is performed may be associated with different distances and communication paths to the central device. For example, some of the peripheral devices may be located relatively close to the central device and may be able to communicate (e.g., transmit and receive on the PAwR train of the central device) with a relatively low transmit power (e.g., a relatively low configured transmit power and a relatively low measured transmitted power). Other ones of the peripheral devices may be located relatively far from the central device and may require a relatively higher transmit power to communicate on the PAwR train of the central device. Additionally, one or more peripheral devices may not have a clear line-of-sight communication path to the central device and may also require a relatively higher transmit power to communicate on the PAwR train of the central device.

In some examples, a synchronization system can be implemented using multiple central devices configured to communicate with a plurality of peripheral devices. For instance, multiple APs can be configured as central devices that can communicate with a plurality of peripheral devices (e.g., ESLs) using one or more PAwR trains, among various other PAs. In some examples, a single central device may be unable to communicate with each peripheral device of the plurality of peripheral devices of the synchronization system. Where multiple central devices are utilized, each central device may communicate with a subset of the plurality of peripheral devices. In some cases, a peripheral device can subscribe to (e.g., join) a PAwR train associated with a single central device. For example, in a synchronization system including multiple central devices, each central device can be associated with a disjoint (e.g., non-overlapping) subset of peripheral devices of a plurality of peripheral devices associated with the synchronization system. In some examples, a peripheral device can subscribe to (e.g., join) one or more PAwR trains each associated with a different central device. For instance, in a synchronization system including multiple central devices, a subset of peripheral devices associated with a particular central device may be at least partially overlapping with a subset of peripheral devices associated with a second central device (e.g., one or more peripheral devices can subscribe to the respective PAwR trains associated with the particular central device and the second central device).

The multiple central devices can communicate with one another using central-to-central communication. In some cases, central-to-central communication may communicate out of band. For instance, in-band central-to-peripheral communication may be performed based on one or more PAwR trains transmitted using BLE. Out of band central-to-central communication can be performed outside of the BLE network. In some cases, out of band central-to-central communication may be performed using internet-based communications between the central devices. Central-to-central communications can additionally be performed using a local area network (LAN) outside of the BLE network, a wireless LAN outside of the BLE network, Ethernet, etc. In such examples, central devices do not directly communicate using Bluetooth or BLE (e.g., in some examples, central-to-central communications are out of band communications). There is a need for systems and techniques that can be used to provide in-band communications between central devices of a synchronization system. There is a further need for systems and techniques that can be used to schedule (e.g., perform subframe allocation for) in-band central-to-central communications to minimize or avoid conflict(s) with PAwR train-based communications between central devices and peripheral devices (e.g., central-to-peripheral communications). There is additionally a need for systems and techniques that can be used to schedule (e.g., perform subframe allocation and/or re-allocation) between unsynchronized PAwR trains based on timing drift between the unsynchronized PAwR trains.

For instance, systems, apparatuses, processes (also referred to as methods), and computer-readable media (collectively referred to as "systems and techniques") are described herein that can be used to perform in-band communication between central devices of a synchronization system, based on using one or more peripheral devices of the synchronization system as bridges. For instance, the peripheral device configured as a bridge (e.g., also referred to as a "bridge," "bridge device," and/or "bridge peripheral device") may receive a central-to-central communication from the first central device using a first PAwR train associated with the first central device and the peripheral device. The bridge peripheral device may transmit the central-to-central communication to the second central device using a second PAwR train associated with the second central device and the bridge peripheral device.

In some examples, a peripheral device that is associated with a first and second central device can be configured as a bridge to relay central-to-central communications between the first and second central devices. For instance, a peripheral device subscribed to a first PAwR train associated with a first central device can scan for other nearby central devices that are within communication range of the peripheral device. In some cases, the peripheral device can perform the scan for other nearby central devices based on receiving a request from the first central device. For instance, the peripheral device can receive a bridge request from the first central device and perform the scan based on receiving the bridge request.

In some cases, the peripheral device can scan for synchronization signals transmitted by or associated with one or more nearby central devices. In some examples, the peripheral device can transmit information to the first central device indicative of the one or more nearby central devices determined by the peripheral device. For instance, the peripheral device may send (e.g., transmit) additional information such as the Received Signal Strength Indicator (RSSI) of one or more signals received by the peripheral device from one or more nearby central devices, a willingness of the nearby central devices to accept additional devices (e.g., additional peripheral devices), etc. In some cases, the additional information transmitted by the peripheral can be utilized by the first central device to improve decision making. The first central device may receive messages indicative of nearby central devices from one or more peripheral devices (e.g., also referred to herein as "bridge candidate" or "bridge candidate devices"). Different bridge candidate devices may be associated with different central devices. For instance, a first bridge candidate device can transmit information to the first central device indicating the first bridge candidate device can be used to establish a bridge between the first central device and a second central device. A second bridge candidate device can transmit information indicating the second bridge candidate device can be used to establish a bridge between the first central device and a third central device.

The first central device may determine (e.g., select) one or more bridge candidate devices and configure each bridge candidate device of the one or more bridge candidate devices as a bridge peripheral device. The selected bridge candidate peripheral device(s) are subscribed to a first PAwR train corresponding to the first central device, and can subscribe to an additional PAwR train corresponding to a central device selected as the bridge destination for central-to-central communications between the first central device and the selected central device.

In one illustrative example, a bridge peripheral device can receive a central-to-central communication from a first central device using a first PAwR train (e.g., associated with the first central device and the bridge peripheral device). The bridge peripheral device may transmit the central-to-central communication to a second central device using a second PAwR train (e.g., associated with the second central device and the bridge peripheral device). In some aspects, a bridge peripheral device can perform bidirectional bridging of central-to-central communications between first and second central devices. For instance, a bridge peripheral device can relay messages from a first central device to a second central device and/or can relay messages from the second central device to the first central device.

In some aspects, bridge peripheral devices are subscribed to multiple PAwR trains which are not synchronized. For example, a bridge peripheral device can subscribe to a first PAwR train of a first central device and a second PAwR train of a second central device, where the first and second PAwR trains are unsynchronized (e.g., unsynchronized with respect to one another). In some cases, an AP Sync command received by the bridge peripheral device on the first PAwR train may overlap with an AP Sync command received by the bridge peripheral device on the second PAwR train (e.g., the respective AP Sync Rx time slots for the first and second PAwR trains at the bridge peripheral device may overlap based on the first and second PAwR trains being unsynchronized).

In one illustrative example, a bridge destination central device (e.g., in the example(s) above, the second central device) can perform subframe allocation to subscribe the bridge peripheral device to a second PAwR train (e.g., corresponding to the second central device) such that the bridge peripheral device's subframe time slot (e.g., Rx and/or response Tx) for the second PAwR train does not overlap or conflict with the bridge peripheral device's subframe time slot for the first PAwR train. For instance, the systems and techniques can perform timing difference-aware subframe allocation for the bridge peripheral device and the bridge destination central device (e.g., the second central device). The bridge peripheral device can determine a time difference between a first synchronization signal associated with the first central device and the first PAwR train and a second synchronization signal associated with the second central device (e.g., bridge destination central device) and the second PAwR train. The bridge peripheral device can indicate the time difference between the first and second synchronization signals to the bridge destination central device (e.g., second central device). In some examples, the bridge peripheral device can indicate other related information associated with the first and second synchronization signals, such as a respective quantity of subframes, a respective subframe duration, etc. For instance, the bridge peripheral device can indicate the time difference in a request to the bridge destination central device and/or in a subsequent message to the bridge destination central device. In some aspects, the bridge peripheral device can indicate the time difference in a joining request to the bridge destination central device.

The bridge destination central device can perform subframe allocation for subscribing the bridge peripheral device to the second PAwR train (and/or can perform subframe reallocation to update the allocated subframe slot for the bridge peripheral device in the second PAwR train) based on the time difference information received from the bridge peripheral device. In one illustrative example, the bridge destination central device can use the time difference information to determine a particular subframe to allocate to the bridge peripheral device within the second PAwR train, wherein the allocated particular subframe is separated from (e.g., does not overlap or conflict with) an allocated subframe for the bridge peripheral device within the first PAwR train. The bridge peripheral device can use the newly allocated particular subframe determined by the bridge destination central device to synchronize with the bridge destination central device and relay (e.g., bridge) messages between the first central device and the bridge destination central device (e.g., and vice versa).

Additional aspects of the present disclosure are described with reference to the figures.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device.

For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or the device(s) 130. The access point(s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
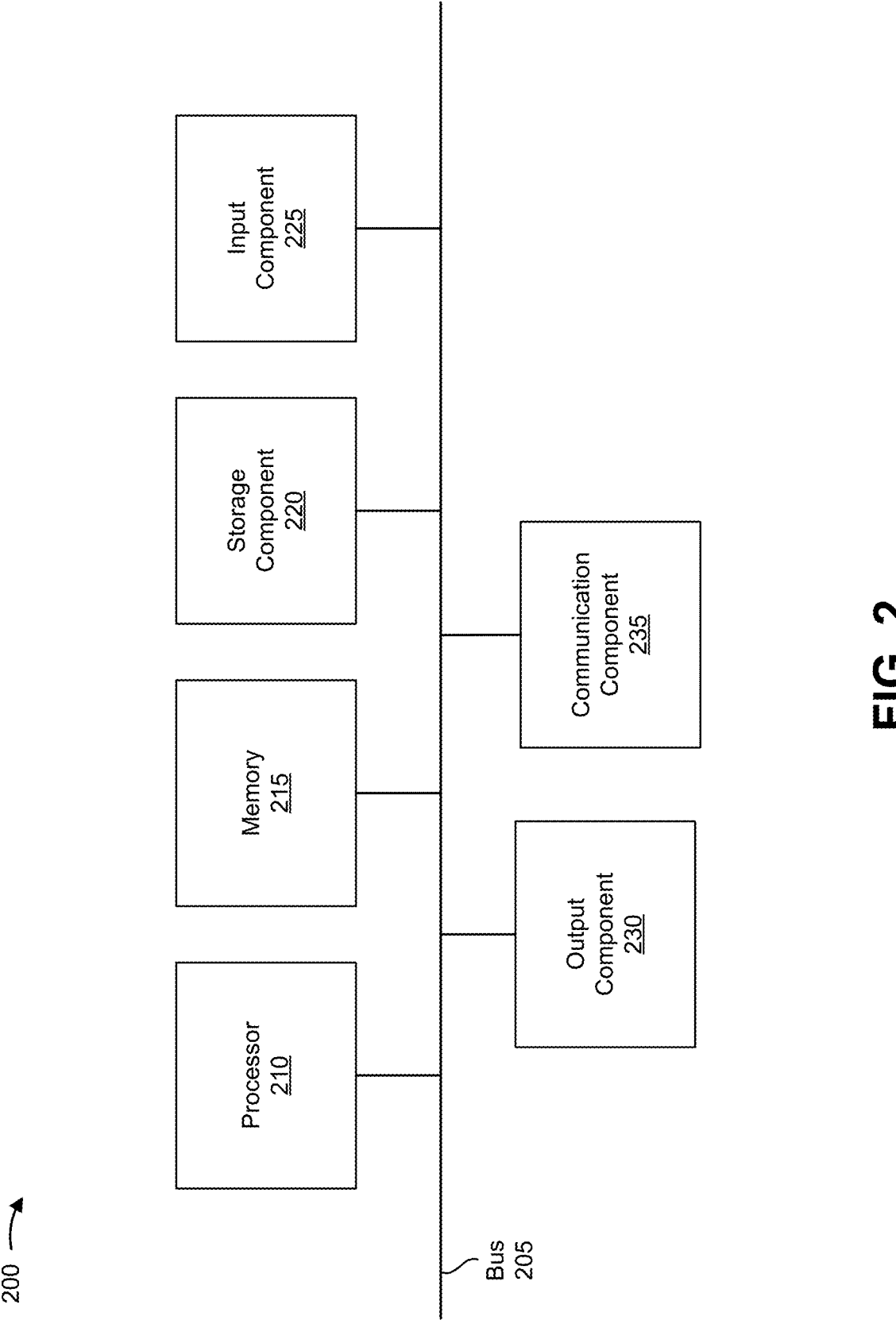
FIG. 2 is a diagram illustrating example components of a device, in accordance with some examples.

FIG. 2 is a diagram illustrating example components of a device 200, in accordance with the present disclosure.

Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
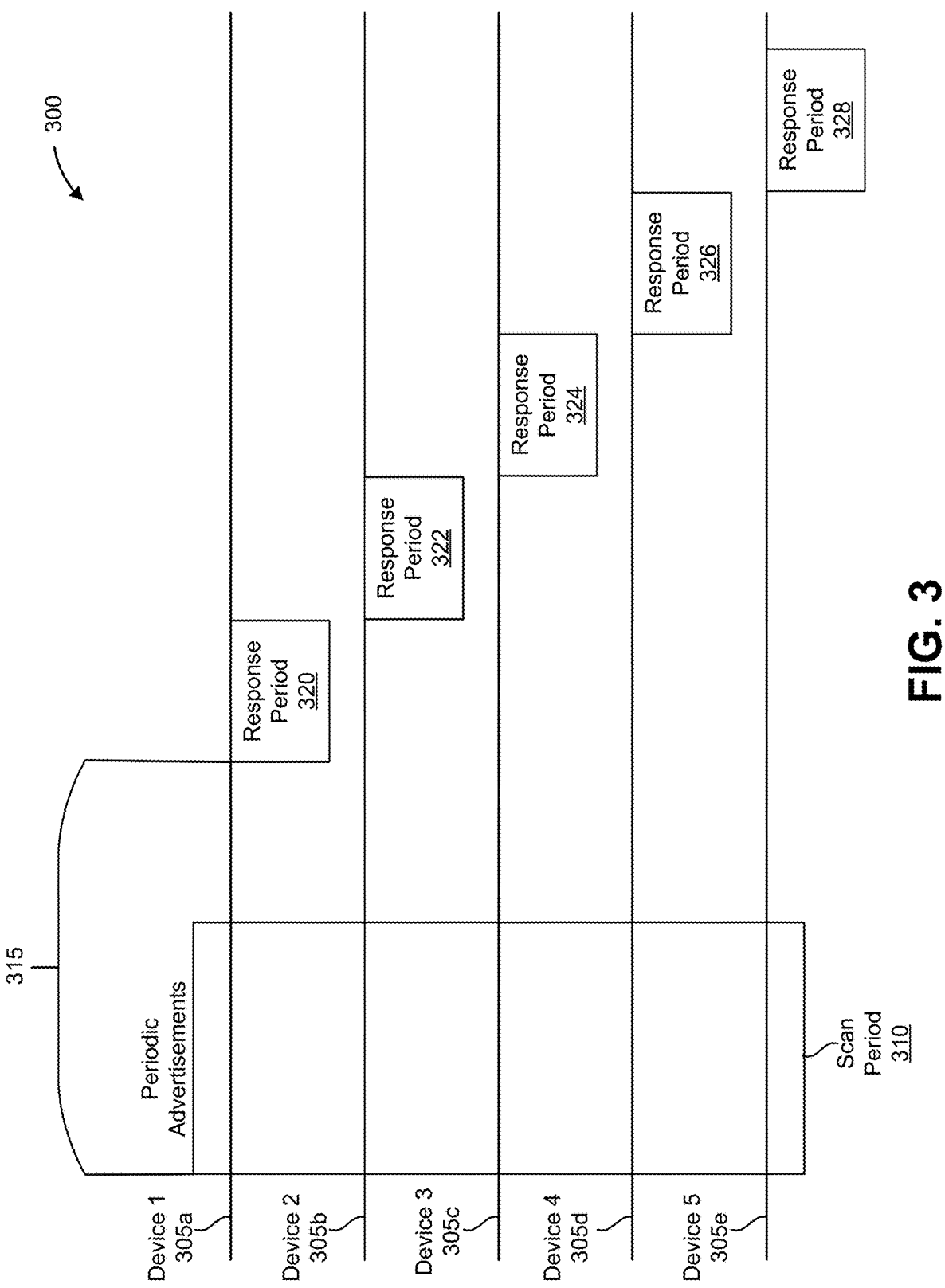
FIG. 3 is a signaling diagram illustrating example communication transmissions, in accordance with some examples.
Figure 4:
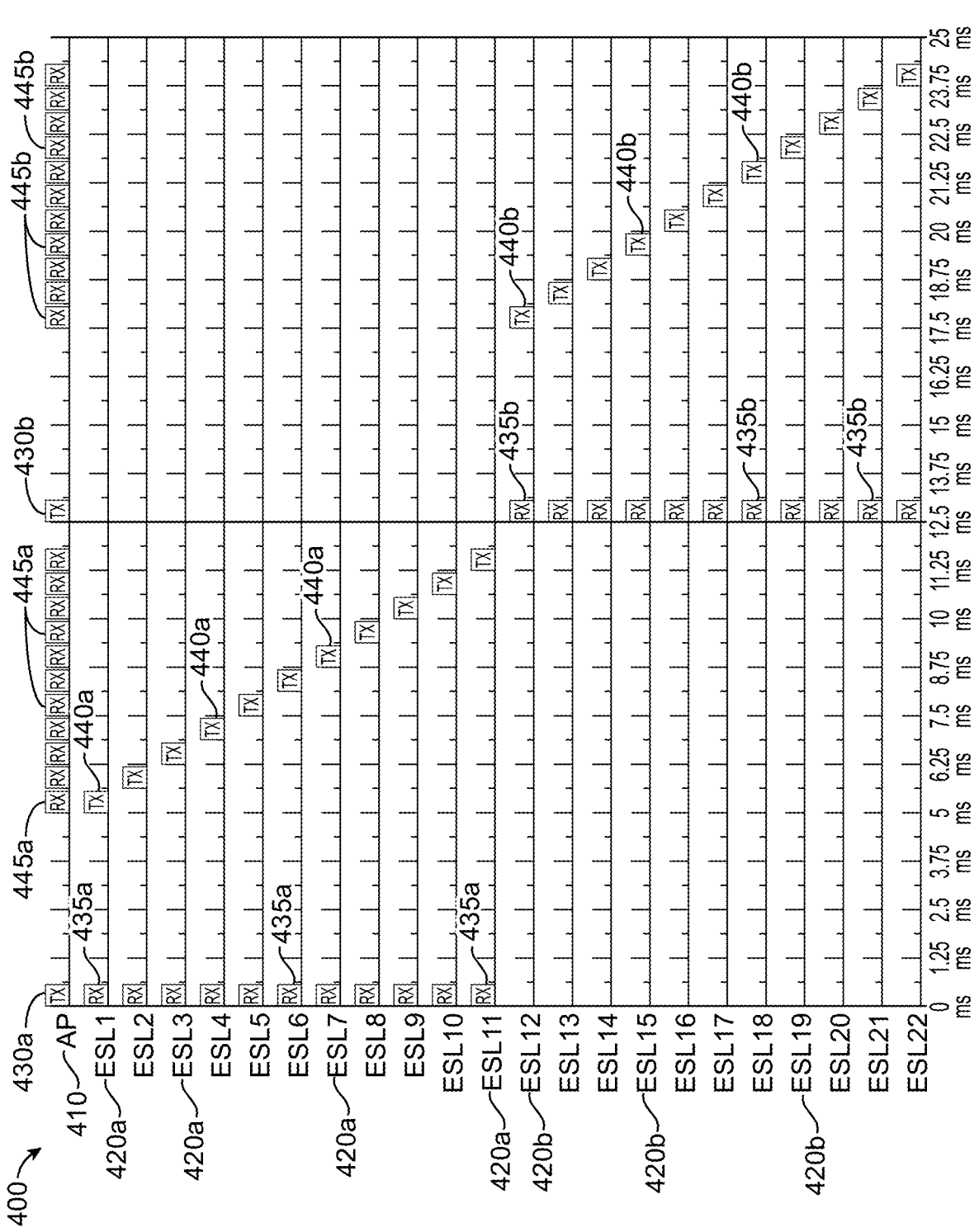
FIG. 4 is a signaling diagram illustrating an example of communication transmissions between a network device and two groups of wireless communication devices, in accordance with some examples.

FIGS. 3 and 4 show signaling diagrams illustrating examples of PAwR in an ESL system. For example, the signaling diagram of FIG. 3 illustrates an example PAwR for a group of wireless network devices (e.g., device 1 305*a*, device 2 305*b*, device 3 305*c*, device 4 305*d*, and device 5 305*e*), and the signaling diagram of FIG. 4 illustrates an example PAwR for two groups of wireless network devices 420*a*, 420*b* (e.g., a first group including ESL1 to ESL 11, and a second group including ESL 12 to ESL 22). Specifically, FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305*a*, device 2 305*b*, device 3 305*c*, device 4 305*d*, and device 5 305*e*) of FIG. 3 may be selected from wireless communication devices 120 of FIG. 1 and may each receive a periodic advertisement (PA) in a scan period 310. The scan period 310 may occur in regularly scheduled intervals and may be repeated periodically such that the devices (e.g., device 1 305*a*, device 2 305*b*, device 3 305*c*, device 4 305*d*, and device 5 305*e*) can awaken to scan for messages during this repeated scan period 310. An access point (e.g., access point 110 of FIG. 1) may provide periodic advertisements (PAs) via broadcast or multi-cast to the devices (e.g., device 1 305*a*, device 2 305*b*, device 3 305*c*, device 4 305*d*, and device 5 305*e*) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305*a*, device 2 305*b*, device 3 305*c*, device 4 305*d*, and device 5 305*e*). The devices (e.g., device 1 305*a*, device 2 305*b*, device 3 305*c*, device 4 305*d*, and device 5 305*e*) may decode or filter the messages intended for each specific device and transmitted during the period when all devices are receiving. In this way, the devices (e.g., device 1 305*a*, device 2 305*b*, device 3 305*c*, device 4 305*d*, and device 5 305*e*) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305*a*, device 2 305*b*, device 3 305*c*, device 4 305*d*, and device 5 305*e*).

As illustrated, the devices (e.g., device 1 305*a*, device 2 305*b*, device 3 305*c*, device 4 305*d*, and device 5 305*e*) are each assigned a response period 320, 322, 324, 326, 328 in the time after the scan period 310. In some cases, the assignment of the response period to a particular device may not be permanent. In some aspects, the assignment may be inferred from a payload of a synchronization message. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305*a* is assigned response period 320, device 2 305*b* is assigned response period 322, device 3 305*c* is assigned response period 324, device 4 305*d* is assigned response period 326, and device 5 305*e* is assigned response period 328. The access point (e.g., access point 110 of FIG. 1) may store attributes of the devices (e.g., device 1 305*a*, device 2 305*b*, device 3 305*c*, device 4 305*d*, and device 5 305*e*), including whether a device is able to transmit or respond. The PA signaling followed by responses can be referred to as periodic advertisement with multiple responses (PAwMR). As used herein, the terms "PAwR" and "PAwMR" may be used interchangeably.

For example, device 3 305*c* (e.g., wireless communication device 120 of FIG. 1) may be an ESL and may receive a price update in a PA from the access point (e.g., access point 110 of FIG. 1) in scan period 310. The PA received at device 3 305*c* may include a designated start time for the response period 324 or may include a schedule of response start times for devices including device 3 305*c*. The response by device 3 305*c* to the access point (e.g., access point 110 of FIG. 1) may include an acknowledgement, a status code, and/or other information such as battery life, received signal strength, and/or an error notification. The response by device 3 305*c* may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305*a*, device 2 305*b*, device 3 305*c*, device 4 305*d*, and device 5 305*e*) may use channels of the Bluetooth protocol.

A device (e.g., device 5 305*e*) that has been assigned a response period may not respond and may determine that it has nothing to signal. For example, the devices (e.g., device 1 305*a*, device 2 305*b*, device 3 305*c*, device 4 305*d*, and device 5 305*e*) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertising channels in Bluetooth.

As previously mentioned, FIG. 4 shows an example PAwR for two groups of wireless network devices 420*a*, 420*b* (e.g., a first group including ESL1 to ESL 11, and a second group including ESL 12 to ESL 22). In particular, FIG. 4 is a signaling diagram illustrating an example of communication transmissions 400 between a network device 410 (e.g., a central device, which may be an access point) and two groups of wireless communication devices 420*a*, 420*b* (e.g., peripheral devices, which may be ESLs). With reference to FIG. 1, the signal sequence illustrated in FIG. 4 may be implemented by one or more of the communication connections, access points 110, and/or wireless communication devices 120 of FIG. 1.

In FIG. 4, the signaling diagram is shown in the form of a graph with an x-axis denoting time in milliseconds (ms) and a y-axis denoting specific wireless communication devices 420*a*, 420*b* (e.g., ESL1, ESL 2, ESL 3, ESL 4, ESL 5, ESL 6, ESL 7, ESL 8, ESL 9, ESL 10, ESL 11, ESL 12, ESL 13, ESL 14, ESL 15, ESL 16, ESL 17, ESL 18, ESL 19, ESL 20, ESL 21, and ESL 22). In particular, the x-axis of the graph of FIG. 4 denotes time starting from 0 ms and ending at 25 ms. The time can be divided into two subframes, which are each a length of 12.5 ms. As such, the two subframes may include a first subframe from 0 ms to 12.5 ms, and a second subframe from 12.5 ms to 25 ms. In one or more examples, there may be more or less than two subframes as is shown in FIG. 4, and/or each subframe may be longer or shorter than 12.5 ms as shown in FIG. 4.

In one or more examples, the wireless communication devices 420a, 420b (e.g., peripheral devices) may be assigned (e.g., by the network device 410 and/or by a network entity, such as a management entity) to different groups (e.g., two groups) of wireless communication devices 420a, 420b. For example, wireless communication devices 420a (e.g., ESL1, ESL 2, ESL 3, ESL 4, ESL 5, ESL 6, ESL 7, ESL 8, ESL 9, ESL 10, and ESL 11) may be assigned to a first group (e.g., group 1), and wireless communication devices 420b (e.g., ESL 12, ESL 13, ESL 14, ESL 15, ESL 16, ESL 17, ESL 18, ESL 19, ESL 20, ESL 21, and ESL 22) may be assigned to second group (e.g., group 2).

In FIG. 4, during operation for PAwR, at time 0 ms for the first subframe of time, the network device 410 (e.g., a central, such as an AP) may transmit 430a to a first group (e.g., group 1) of wireless communication devices 420a (e.g., ESL 1, ESL 2, ESL 3, ESL 4, ESL 5, ESL 6, ESL 7, ESL 8, ESL 9, ESL 10, and ESL 11) a PA containing a synchronization message (e.g., an AP synchronization message) over a synchronized channel between the network device 410 and the wireless communication devices 420a, 420b. As noted previously, a synchronization message can include one or more commands. For instance, a command can include an operational code (OpCode) and parameters associated with the command. At time 0 ms, the first group of wireless communication devices 420a (e.g., ESL 1, ESL 2, ESL 3, ESL 4, ESL 5, ESL 6, ESL 7, ESL 8, ESL 9, ESL 10, and ESL 11) can receive 435a the PA containing synchronization message over the synchronized channel.

In one or more examples, the network device 410 may be configured to transmit PAs at a specified time interval (e.g., a subframe of time), such as at every 12.5 ms as is shown in FIG. 4. In one or more examples, the specified time interval (e.g., a subframe) may be shorter or longer than the 12.5 ms as is shown in FIG. 4. The wireless communication devices 420a, 420b may respond to a PA by using their specific respective response slot in time.

In one or more examples, the synchronization message transmitted 430a to the first group (e.g., group 1) of wireless communication devices 420a (e.g., ESL 1, ESL 2, ESL 3, ESL 4, ESL 5, ESL 6, ESL 7, ESL 8, ESL 9, ESL 10, and ESL 11) may indicate a respective response slot for one or more of the wireless communication devices 420a (e.g., ESL 1, ESL 2, ESL 3, ESL 4, ESL 5, ESL 6, ESL 7, ESL 8, ESL 9, ESL 10, and/or ESL 11) in the first group to use to transmit 440a a response to the network device 410. If a wireless communication device 420a (e.g., ESL 1, ESL 2, ESL 3, ESL 4, ESL 5, ESL 6, ESL 7, ESL 8, ESL 9, ESL 10, and ESL 11) is addressed within the synchronization message, the wireless communication device 420a (e.g., ESL 1, ESL 2, ESL 3, ESL 4, ESL 5, ESL 6, ESL 7, ESL 8, ESL 9, ESL 10, and ESL 11) can respond (e.g., transmit 440a) in its respective response slot, as indicated within the synchronization message.

For example, the synchronization message may indicate a specific sequence for one or more of the wireless communication devices 420a (e.g., ESL 1, ESL 2, ESL 3, ESL 4, ESL 5, ESL 6, ESL 7, ESL 8, ESL 9, ESL 10, and/or ESL 11) to respond (e.g., transmit 440a) in time (e.g., responding after 5 ms has elapsed after the start of the subframe at response slots located every 0.625 ms). For example, the sequence may indicate that wireless communication device 420a (e.g., ESL 1) should respond in a response slot located at 5 ms, wireless communication device 420a (e.g., ESL 2) should respond in a response slot located at 5.625 ms, wireless communication device 420a (e.g., ESL 3) should respond in a response slot located at 6.25 ms, wireless communication device 420a (e.g., ESL 4) should respond in a response slot located at 6.875 ms, wireless communication device 420a (e.g., ESL 5) should respond in a response slot located at 7.5 ms, wireless communication device 420a (e.g., ESL 6) should respond in a response slot located at 8.125 ms, wireless communication device 420a (e.g., ESL 7) should respond in a response slot located at 8.75 ms, wireless communication device 420a (e.g., ESL 8) should respond in a response slot located at 9.375 ms, wireless communication device 420a (e.g., ESL 9) should respond in a response slot located at 10 ms, wireless communication device 420a (e.g., ESL 10) should respond in a response slot located at 10.625 ms, and wireless communication device 420a (e.g., ESL 11) should respond in a response slot located at 11.25 ms.

After the wireless communication devices 420a (e.g., ESL 1, ESL 2, ESL 3, ESL 4, ESL 5, ESL 6, ESL 7, ESL 8, ESL 9, ESL 10, and ESL 11) have received 435a the PA containing the synchronization message from the network device 410, according to the sequence specified within the synchronization message, the one or more wireless communication devices 420a (e.g., ESL 1, ESL 2, ESL 3, ESL 4, ESL 5, ESL 6, ESL 7, ESL 8, ESL 9, ESL 10, and/or ESL 11) can transmit 440a their responses within their respective response slots. After the one or more wireless communication devices 420a (e.g., ESL 1, ESL 2, ESL 3, ESL 4, ESL 5, ESL 6, ESL 7, ESL 8, ESL 9, ESL 10, and/or ESL 11) have transmitted 440a their responses in their respective time slots, the network device 410 can receive 445a their transmitted responses at those specific response slot times.

Then, during operation for PAwR, at time 12.5 ms for the second subframe of time, the network device 410 may transmit 430b to a second group (e.g., group 2) of wireless communication devices 420b (e.g., ESL 12, ESL 13, ESL 14, ESL 15, ESL 16, ESL 17, ESL 18, ESL 19, ESL 20, ESL 21, and ESL 22) a PA containing a synchronization message over a synchronized channel between the network device 410 and the wireless communication devices 420a, 420b. In addition, at time 12.5 ms, the second group of wireless communication devices 420b (e.g., ESL 12, ESL 13, ESL 14, ESL 15, ESL 16, ESL 17, ESL 18, ESL 19, ESL 20, ESL 21, and ESL 22) can receive 435b the PA containing the synchronization message over the synchronized channel.

The synchronization message transmitted 430b to the second group (e.g., group 2) of wireless communication devices 420b (e.g., ESL 12, ESL 13, ESL 14, ESL 15, ESL 16, ESL 17, ESL 18, ESL 19, ESL 20, ESL 21, and ESL 22) may indicate a respective response slot for one or more of the wireless communication devices 420b (e.g., ESL 12, ESL 13, ESL 14, ESL 15, ESL 16, ESL 17, ESL 18, ESL 19, ESL 20, ESL 21, and/or ESL 22) in the second group to use to transmit 440b a response to the network device 410. If a wireless communication device 420b (e.g., ESL 12, ESL 13, ESL 14, ESL 15, ESL 16, ESL 17, ESL 18, ESL 19, ESL 20, ESL 21, and ESL 22) is addressed within the synchronization message, the wireless communication device 420b (e.g., ESL 12, ESL 13, ESL 14, ESL 15, ESL 16, ESL 17, ESL 18, ESL 19, ESL 20, ESL 21, and ESL 22) can respond (e.g., transmit 440b) in its respective response slot, as indicated within the synchronization message.

For example, the synchronization message may indicate a specific sequence for one or more of the wireless communication devices 420*b* (e.g., ESL 12, ESL 13, ESL 14, ESL 15, ESL 16, ESL 17, ESL 18, ESL 19, ESL 20, ESL 21, and/or ESL 22) to respond (e.g., transmit 440*b*) in time (e.g., responding after 5 ms has elapsed after the start of the subframe at response slots located every 0.625 ms). For example, the sequence may indicate that wireless communication device 420*b* (e.g., ESL 12) should respond in a response slot located at 17.5 ms, wireless communication device 420*b* (e.g., ESL 13) should respond in a response slot located at 18.125 ms, wireless communication device 420*b* (e.g., ESL 14) should respond in a response slot located at 18.75 ms, wireless communication device 420*b* (e.g., ESL 15) should respond in a response slot located at 19.375 ms, wireless communication device 420*b* (e.g., ESL 16) should respond in a response slot located at 20 ms, wireless communication device 420*b* (e.g., ESL 17) should respond in a response slot located at 20.625 ms, wireless communication device 420*b* (e.g., ESL 18) should respond in a response slot located at 21.25 ms, wireless communication device 420*b* (e.g., ESL 19) should respond in a response slot located at 21.875 ms, wireless communication device 420*b* (e.g., ESL 20) should respond in a response slot located at 22.5 ms, wireless communication device 420*b* (e.g., ESL 21) should respond in a response slot located at 23.125 ms, and wireless communication device 420*b* (e.g., ESL 22) should respond in a response slot located at 23.75 ms.

After the wireless communication devices 420*b* (e.g., ESL 12, ESL 13, ESL 14, ESL 15, ESL 16, ESL 17, ESL 18, ESL 19, ESL 20, ESL 21, and ESL 22) have received 435*b* the PA containing the synchronization message from the network device 410, according to the sequence specified within the synchronization message, the one or more wireless communication devices 420*b* (e.g., ESL 12, ESL 13, ESL 14, ESL 15, ESL 16, ESL 17, ESL 18, ESL 19, ESL 20, ESL 21, and/or ESL 22) may transmit 440*b* their responses within their respective response slots. After the one or more wireless communication devices 420*b* (e.g., ESL 12, ESL 13, ESL 14, ESL 15, ESL 16, ESL 17, ESL 18, ESL 19, ESL 20, ESL 21, and/or ESL 22) have transmitted 440*b* their responses in their respective time slots, the network device 410 can receive 445*b* their transmitted responses at those specific response slot times. Then, the PAwR may continue similarly for subsequent subframes of time.

As previously noted, PAwR can be used to synchronize peripheral devices (e.g., wireless communication device 420*a*, 420*b*, a peripheral device such as an ERL, etc.) with a network device (e.g., network device 410, a central device such as an access point, etc.), but may perform subframe allocation independent of one or more transmit power determinations. For example, subframe allocation may be performed independent of one or more transmit power determinations (e.g., such as minimum transmit power requirements or determinations) from a central device to a peripheral device, and vice versa. In some cases, PAwR transmissions from a central device to a peripheral device may utilize a constant transmit power across all subframes and/or across all peripheral devices. PAwR transmissions from various peripheral devices to a central device may additionally utilize a constant transmit power.

As noted above, there is a need for systems and techniques that can be used to provide in-band communications between central devices of a synchronization system, for instance by using a peripheral device as a bridge between a first central device and a second central device (e.g., a bridge destination central device). For instance, the peripheral device configured as a bridge (e.g., also referred to as a "bridge," "bridge device," and/or "bridge peripheral device") may receive a central-to-central communication from the first central device using a first PAwR train associated with the first central device and the peripheral device. The bridge peripheral device may transmit the central-to-central communication to the bridge destination central device (e.g., second central device) using a second PAwR train associated with the second central device and the bridge peripheral device.

Figure 5:
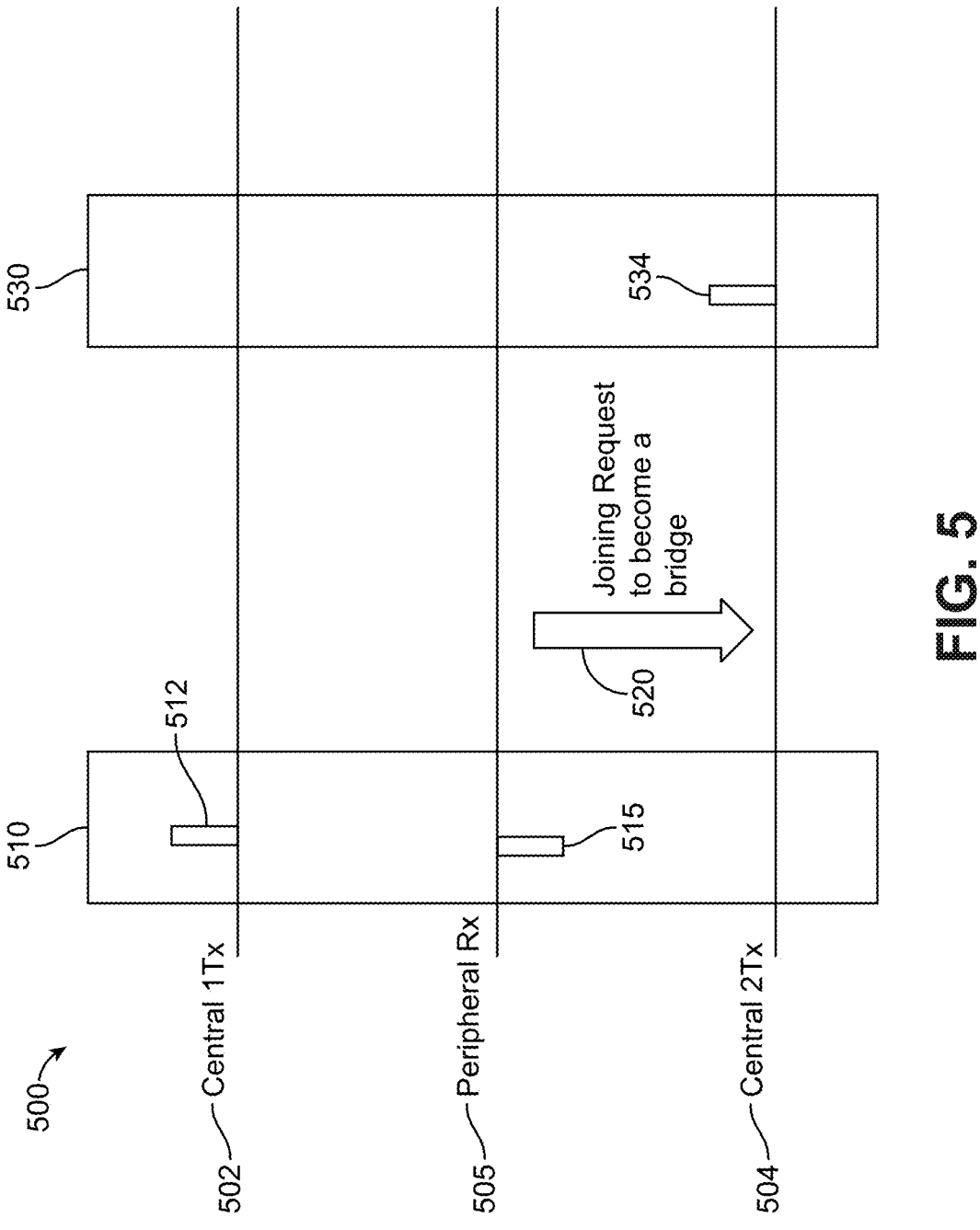
FIG. 5 is a signaling diagram illustrating an example of periodic advertisement (PA) transmissions between central devices and a peripheral device, in accordance with some examples.

FIG. 5 is a signaling diagram illustrating an example of periodic advertisement (PA) transmissions 500 between central devices and a peripheral device, in accordance with some examples. For instance, FIG. 5 illustrates transmissions associated with a first central device (e.g., central 1 Tx 502) and transmissions associated with a second central device (e.g., central 2 Tx 504) different from the first central device. A peripheral device 505 can be associated with the first central device (e.g., subscribed to a first PAwR train associated with the first central device) and can be used as a bridge between the first and second central devices based on subsequently subscribing to a second PAwR train associated with the second central device.

In a first time window 510 (e.g., a PAwR frame, a PAwR sub-frame, etc.), the central 1 device 502 can transmit a first message 512. The first message 512 can be transmitted to peripheral device 505 using a first PAwR train associated with the central 1 device 502. For example, peripheral device 505 can be synchronized with central 1 device 502 and the first PAwR train based on previously having been subscribed and/or onboarded to the central 1 device 502 and the corresponding first PAwR train. The first message 512 transmitted by central 1 device 502 can be received at peripheral device 505 as the received message 515. The received message 515 can be received by peripheral device 505 using a particular time slot of the time window 510. For instance, the transmitted (Tx) message 512 from central 1 device 502 and the received (Rx) message 515) at peripheral device 505 can be associated with a same time slot within time window 510, based on peripheral device 505 being subscribed to (e.g., synchronized to) central 1 device 502 and the corresponding first PAwR train.

In one illustrative example, the peripheral device 505 can be configured to act as a bridge (e.g., relay) for central-to-central communications between first central device 502 and second central device 504. For instance, peripheral device 505 can receive a bridge configuration message or bridge configuration request from first central device 502. The bridge configuration can be indicative of a request for peripheral device 505 to subscribe to the corresponding second PAwR train associated with second central device 504 and relay central-to-central communications between first central device 502 and second central device 504. For example, peripheral device 505 can transmit a join request 520 to second central device 504, based on receiving a bridge configuration (or other bridge indication) from first central device 502 that is indicative of second central device 504. The join request 520 can be indicative of a joining request to become a bridge (e.g., a joining request from peripheral device 505 to subscribe to the corresponding second PAwR train of second central device 504 and bridge central-to-central communications between first central device 502 and second central device 504).

Based on receiving the join request 520 from peripheral device 505, the second central device 504 can perform subframe allocation to assign a particular subframe for peripheral device 505. As noted previously with respect to FIG. 4, a subframe can include a fixed Tx slot that is used by the AP, a first response delay interval, and a plurality of response slots where the peripheral devices associated with the AP and/or subframe can transmit (e.g., and the AP and/or central devices can receive). For instance, the second central device 504 can allocate a subframe and/or subframe time slot for bidirectional communication between peripheral device 505 and second central device 504 using the second PAwR train associated with second central device 504.

In some examples, the second central device 504 can allocate the time slot 534 within second time window 530 to the peripheral device 505 (e.g., in response to receiving the joining request 520 to become a bridge from peripheral device 505). The time slot 534 can be included in the second PAwR train associated with second central device 504, and may be used for transmissions by second central device 504 (e.g., Tx by second central device 504 and Rx by peripheral device 505). In some examples, based on group allocation being managed by the central device, a peripheral device (e.g., peripheral device 505) may be unable to decide solely on which group (e.g., of a plurality of groups) to subscribe to. For instance, the peripheral device may transmit a joining request for a particular group, but the peripheral device cannot join the particular group unless the joining request is accepted by the central device. If the joining request is not accepted by the central device (e.g., if the central device rejects the joining request), the peripheral device is unable to join the particular group. In some cases, the peripheral device 505 may be unaware of when to subscribe to second central device 504's PAwR train (e.g., unaware of one or more time slots within time window 530) to avoid overlapping or conflicting with the peripheral device 505's allocated time slot (e.g., subframe and/or subframe time slot) 512, 515 associated with the first central device 502's PAwR train.

In one illustrative example, the time window 530 can be a subframe (e.g., a 12.5 ms subframe included in 128 12.5 ms subframes of a 1.6 s frame). For instance, if peripheral device 505 subscribes to the second PAwR train of second central device 504 using a time slot 534 that overlaps (e.g., partially or wholly) with the time slot allocated to peripheral device 505 for the first PAwR train of first central device 502 (e.g., the time slot within time window 530 corresponding to the first PAwR train time slot 515 within time window 510), peripheral device 505 will be unable to bridge central-to-central communications between the first and second central devices 502, 504.

In one illustrative example, the systems and techniques can perform timing difference-aware subframe allocation for subscribing a bridge candidate peripheral device to a PAwR train of a bridge destination central device. For instance, the systems and techniques can perform timing difference-aware subframe allocation for subscribing the peripheral device 505 of FIG. 5 to the second central device 504 of FIG. 5, as will be described in greater depth below.

Figure 6:
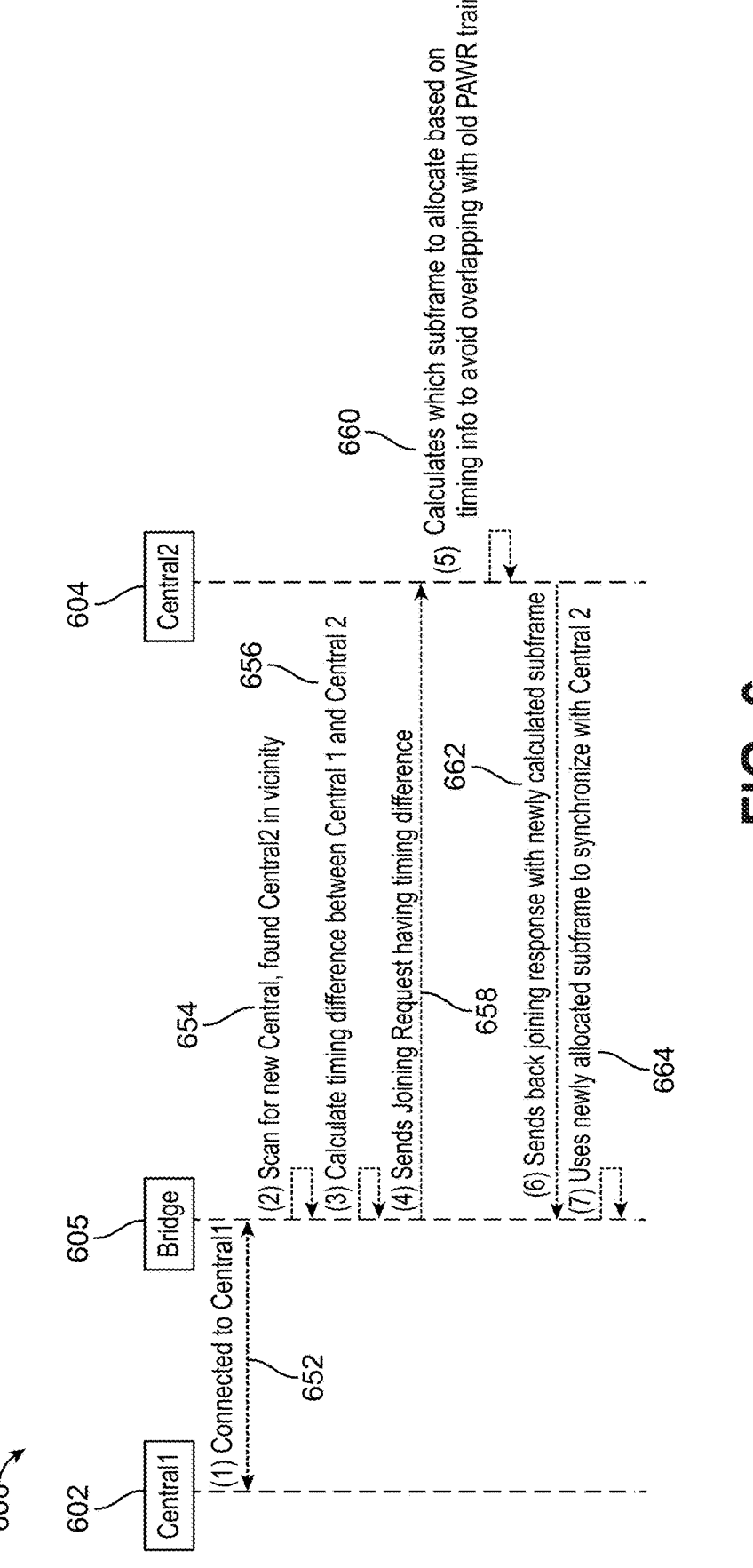
FIG. 6 is a signaling diagram illustrating an example subframe allocation process for configuring a peripheral device as a bridge between central devices, in accordance with some examples.

FIG. 6 is a signaling diagram illustrating an example subframe allocation process 600 that can be used to config-ure a peripheral device as a bridge between central devices, in accordance with some examples. For instance, the example subframe allocation process 600 can be performed to configure a bridge peripheral device 605 to relay (e.g., bridge) central-to-central communications or various other messages between a first central device 602 (e.g., "Cen-tral1") and a second central device 604 (e.g., "Central2"). In some cases, the bridge peripheral device 605 can be the same as or similar to the peripheral device 505 of FIG. 5; the first central device 602 can be the same as or similar to the first central device 502 of FIG. 5; and/or the second central device 604 can be the same as or similar to the second central device 504 of FIG. 5. In some aspects, the second central device 604 can also be referred to as a "bridge destination central device."

At block 652, the process 600 includes establishing a connection between first central device 602 and peripheral device 605. As will be described in greater detail below, the peripheral device 605 may be referred to as a "bridge candidate peripheral device" or a "potential bridge candidate peripheral device" prior to the peripheral device 605 using a newly allocated subframe to synchronize with the second central device 604 (e.g., at block 664). A peripheral device that is synchronized with at least a first and second central device (e.g., such as peripheral device 605 after block 664) can be referred to as a "bridge" and/or a "bridge peripheral device." In some cases, the connection can be a synchro-nized connection (e.g., block 652 can include synchronizing or subscribing bridge peripheral device 605 to first central device 602). Based on the synchronized connection between first central device 602 and bridge peripheral device 605, the first central device 602 can transmit (e.g., and bridge periph-eral device 605 can receive) a periodic synchronization message. For example, the periodic synchronization mes-sage can be an AP Sync command with a periodicity of 1.6 seconds (e.g., the duration of a PAwR frame).

In some aspects, after establishing the synchronized con-nection between first central device 602 and bridge periph-eral device 605, the process 600 can include transmitting a request (e.g., from first central device 602 to bridge periph-eral device 605) to scan for nearby central devices. For instance, based on receiving the request from first central device 602, the bridge peripheral device 605 can scan for other central devices with which bridge peripheral device 605 may be able to establish a connection with (e.g., join the corresponding PAwR train of).

At block 654, bridge peripheral device 605 can scan for synchronization signals transmitted by or associated with one or more nearby central devices (e.g., also referred to as "additional central devices" and/or "bridge candidate central devices"). In some examples, bridge peripheral device 605 can transmit information to the first central device 602 indicative of the one or more nearby central devices deter-mined by the bridge peripheral device 605. The first central device 602 may receive messages indicative of nearby central devices from one or more peripheral devices, where the one or more peripheral devices include the bridge peripheral device 605. Peripheral devices that perform a scan for nearby or additional central devices can also be referred to as "bridge candidates" and/or "bridge candidate peripheral devices." The different bridge candidate periph-eral devices may be associated with different central devices. For instance, a first bridge candidate device can transmit information to the first central device indicating the first bridge candidate device can be used to establish a bridge between the first central device and a second central device; a second bridge candidate device can transmit information indicating the second bridge candidate device can be used to establish a bridge between the first central device and a third central device; etc. In some aspects, a first bridge candidate device can transmit information indicating that the first bridge candidate device can be used to establish a bridge between additional central devices (e.g., a third central device, a fourth central device, etc.).

In some cases, first central device 602 may receive messages indicative of the nearby or additional central devices that may be bridged by each respective bridge candidate peripheral device that performs the scan of block 654. Based on receiving the messages, first central device 602 can determine one or more bridge candidate peripheral devices to be configured as a bridge for a respective bridge destination central device. In some aspects, multiple peripheral devices can be configured as a bridge to the same bridge destination central device (e.g., first central device 602 and second central device 604 can be bridged by the bridge 605 and by one or more additional bridge peripheral devices that are the same as or similar to the bridge peripheral device 605). In some examples, a peripheral device can be configured as a bridge to multiple bridge destination central devices (e.g., the bridge 605 can bridge first central device 602 to second central device 604 and may additionally bridge one of the first or second central devices 602, 604 to a third central device). In some examples, a synchronization system can include a plurality of peripheral devices configured as bridges between at least two central devices of the synchronization system. Based on the plurality of bridges implemented using the plurality of bridge peripheral devices, the central devices (e.g., APs) included in the synchronization system can communicate with some (or all) of the remaining central devices also included in the synchronization system, based on using one or more bridges of the plurality of bridges.

In some cases, the bridge peripheral device 605 can perform block 654 to scan for nearby or additional central devices and may subscribe to the corresponding PAwR train of a nearby central device (e.g., second central device 604) without communicating back to the first central device 602, as was described above. For example, in some aspects bridge peripheral device 605 can automatically attempt to configure as a bridge by subscribing to the PAwR train of second central device 604, based on discovering second central device 604 during the scan associated with block 654.

At block 656, bridge peripheral device 605 can determine (e.g., calculate) a timing difference associated with first central device 602 and second central device 604. In some cases, the timing difference can be included in a timing difference information determined by bridge peripheral device 605. Bridge peripheral device 605 may determine the timing difference information prior to joining (e.g., subscribing to) the second PAwR train of second central device 604. For instance, bridge peripheral device 605 can determine the timing difference information based on scan information associated with the scan for nearby central devices performed at block 654.

In one illustrative example, to determine the timing difference information associated with (e.g., between) first central device 602 and second central device 604, bridge peripheral device 605 can determine a timing difference between respective synchronization signals associated with the first and second central devices 602, 604. In some aspects, the respective synchronization signals can be AP Sync commands transmitted by or associated with the first and second central devices 602, 604, respectively. For instance, bridge peripheral device 605 can determine timing information associated with an AP Sync command received from first central device 602 (e.g., based on bridge peripheral device 605 and first central device 602 being synchronized at block 652). The AP Sync command can be indicative of a start time of a corresponding PAwR frame associated with first central device 602 and the corresponding first PAwR train. For instance, first central device 602 can transmit an AP Sync (e.g., which may be received by bridge 605) every 1.6 seconds, corresponding to the duration of each PAwR frame.

The second synchronization signal, associated with the bridge destination central device (e.g., second central device 604) can be an AP Sync command received by bridge candidate device 605 from second central device 604 during the scan performed at block 654. In some examples, the second synchronization signal can be an AP Sync command received by bridge 605 from second central device 604 subsequent to the scan performed at block 654. In one illustrative example, during the scan performed at block 654, the bridge candidate device (e.g., peripheral 605) can receive an extended advertisement indicative of an instant in time to receive the AP Sync command. In some aspects, the timing difference computation of block 656 can be based at least in part on the extended advertisement and the indication of the instant in time to receive the AP Sync command from second central device 604. Subsequently, the bridge candidate device 605 may scan for the AP Sync command and send a joining request as an unsolicited message on one of the response slots. The second AP Sync command can be indicative of a start time of a corresponding PAwR frame associated with second central device 604 and the second PAwR train (e.g., the second PAwR train that will be bridged to the first PAwR train by the bridge peripheral device 605). In some aspects, bridge peripheral device 605 can scan and/or synchronize with the second central device 604 on a default group and/or on an available group (e.g., indicated based on a signal received during the scan of block 654). For instance, the second synchronization signal (e.g., second AP Sync command) can be determined by bridge 605 as a time associated with group 0 or time slot 0 of the PAwR frame corresponding to second central device 604 and/or the second PAwR train.

At block 658, the bridge peripheral device 605 can transmit a joining request to the bridge destination central device (e.g., second central device 604). For instance, bridge 605 can transmit a joining request to second central device 604 that is indicative of the timing difference information determined at bock 656. In some aspects, the joining request transmitted by bridge 605 at block 658 can be the same as or similar to the joining request 520 of FIG. 5.

In one illustrative example, the timing difference information can be indicative of a time difference between the first and second AP Sync commands associated with first central device 602 and second central device 604, respectively. For instance, the timing difference information may directly indicate a difference between a time slot (e.g., group 0, time slot 0, etc.) associated with the first AP Sync command and a time slot associated with the second AP Sync command (e.g., group 0, time slot 0). In some aspects, the timing difference information can indicate first timing information associated with the first central device 602 and the first PAwR train (e.g., time information of the first AP Sync command) and second timing information associated with the second central device 604 and the second PAwR train (e.g., time information of the second AP Sync command). In some examples, the timing difference information can be included in the joining request transmitted by bridge 605 and received by second central device 604. In another example, the timing difference information can be included in a subsequent message transmitted by bridge 605 and received by second central device 604 (e.g., after initial synchronization and/or subframe allocation has been performed).

At block 660, the second central device 604 can perform subframe allocation for subscribing the bridge peripheral device to the second PAwR train of second central device 604, based on the timing difference information determined (e.g., by bridge peripheral device 605) at block 656 and received (e.g., by second central device 604) at block 658.

For instance, second central device 604 can determine (e.g., calculate) a particular subframe to allocate to the bridge peripheral device 605 on the second PAwR train. In some cases, the particular subframe can be determined or selected by second central device 604 such that the first and second PAwR trains are separated at the bridge peripheral device 604. For instance, second central device 604 can allocate bridge peripheral device 605 a particular subframe (and/or subframe time slot) for the second PAwR train that is different than the subframe (and/or subframe time slot) allocated to bridge peripheral device 605 for the first PAwR train.

In some aspects, second central device 604 can allocate bridge 605 a subframe for the second PAwR train that is separated from the subframe corresponding to the first PAwR train at bridge 605 by one or more subframes. In some examples, second central device 604 may receive timing difference information from bridge 605 (e.g., at block 658) that is in units of subframes. In some aspects, second central device 604 can receive timing difference information from bridge 605 (e.g., at block 658) that is in units of seconds (e.g., milliseconds, microseconds, etc.). Second central device 604 can implement a rounding logic to convert timing difference information indicative of a quantity of milliseconds or microseconds separating the first and second synchronization signals (e.g., first and second AP Sync commands associated with the first and second central devices 602, 604, respectively) into subframe slot information.

For instance, a timing difference information indicative of a 12.5 ms difference between the first and second AP Sync commands may be indicative of a one subframe difference (e.g., based on a PAwR subframe duration of 12.5 ms). A timing difference information indicative of a 25 ms difference between the first and second AP Sync commands may be indicative of a two subframe difference. A timing difference information indicative of a 37.5 ms difference between the first and second AP Sync commands may be indicative of a three subframe difference, based on a rounding logic implemented at second central device 604 that rounds up to the nearest integer quantity of subframes. In some cases, timing difference information can be converted from a quantity of milliseconds or microseconds between the first and second AP Sync commands into subframe information.

At block 662, the second central device 604 transmits (e.g., and the bridge peripheral device 605 receives) a joining response indicative of the allocated subframe determined at block 660 for the bridge peripheral device 605 to use to subscribe to (e.g., join) the second PAwR train associated with the second central device 604.

At block 664, the bridge peripheral device 605 can use the newly allocated subframe (e.g., determined at block 660 and indicated in the joining response at block 662) to synchronize with second central device 604 on the second PAwR train. Based on the newly allocated subframe for the second PAwR train at bridge 605 being determined using the timing difference information between the first synchronization signal associated with first central device 602 and the second synchronization signal associated with second central device 604, at block 664 the bride 605 can synchronize with the second PAwR train of second central device 604 without overlapping, conflicting, colliding, etc., with the previously-subscribed first PAwR train of first central device 602. For instance, with reference to FIG. 5, the bridge peripheral device 605 of FIG. 6 can use the newly allocated subframe determined at block 660 and indicated in the joining response at block 662 to synchronize with second central device 604 and/or the second PAwR train such that the subframe slot 534 associated with communications between bridge 505 and second central device 504 of FIG. 5 does not overlap, conflict, collide, etc., with the subframe slot 515 associated with communications between the bridge 505 and first central device 502 of FIG. 5.

Based on using the timing difference information between the first and second synchronization signals (e.g., associated with first central device 602 and second central device 604, respectively, of FIG. 6), the systems and techniques can be used to implement a bridge peripheral device (e.g., bridge 605) without group-level clock offset updates.

In some cases, bridge 605 may establish synchronization with first central device 602 (e.g., first PAwR train) and with second central device 604 (e.g., second PAwR train) independently. For example, bridge 605 can establish synchronization with the first and second PAwR trains individually, while the first PAwR train remains unsynchronized with the second PAwR train. In some cases, based on the first and second PAwR trains not being synchronized with each other, and based on the respective clocks associated with implementing each of the first and second PAwR trains, the respective allocated subframe slots for the bridge 605 on each of the first and second PAwR trains may eventually collide.

Figure 7:
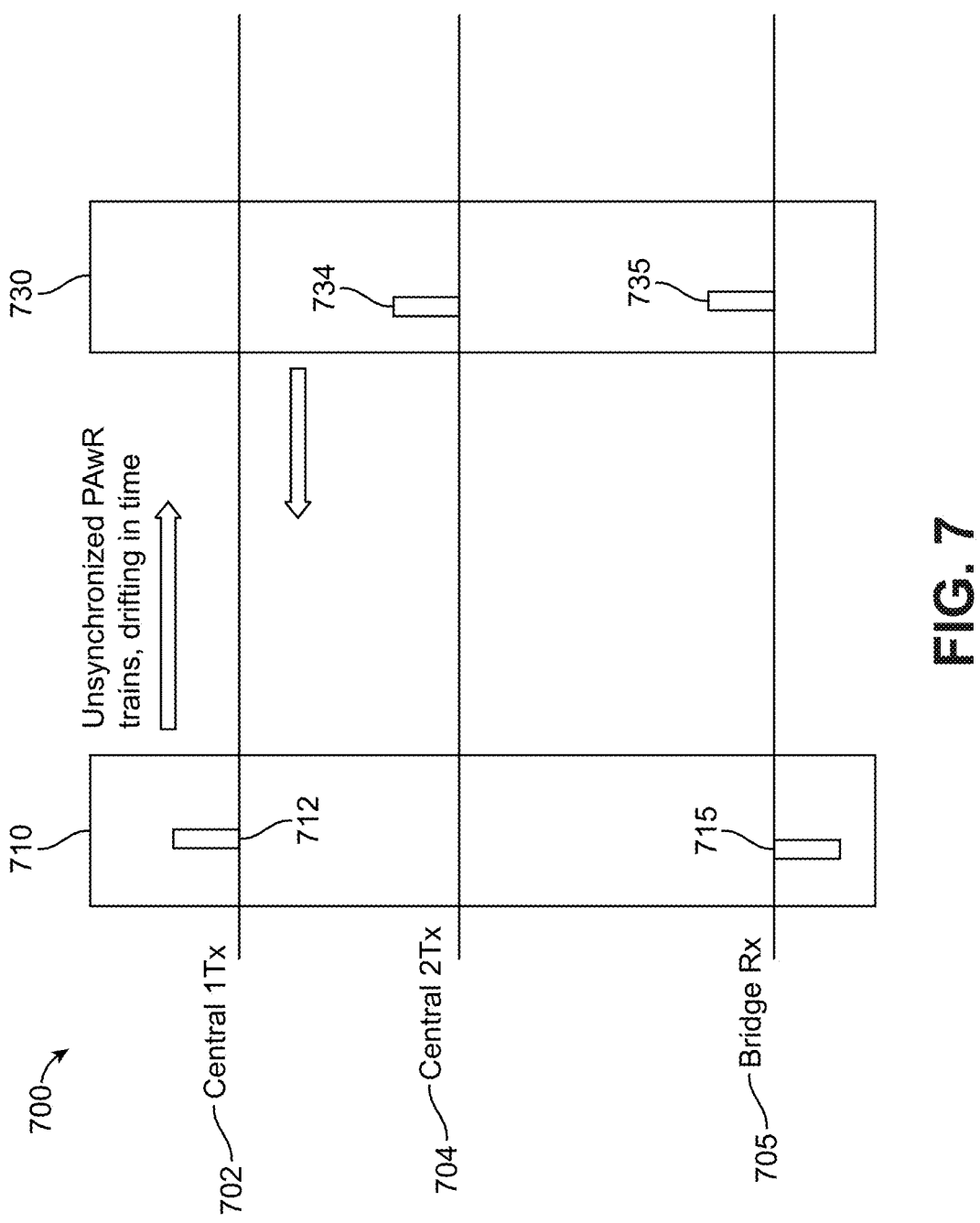
FIG. 7 is a signaling diagram illustrating an example of timing drift between periodic advertisement (PA) transmissions between a first central device and a peripheral device and PA transmissions between a second central device and the peripheral device, in accordance with some examples.

For example, FIG. 7 is a signaling diagram illustrating an example of timing drift 700 between periodic advertisement (PA) transmissions of a first PAwR train and PA transmissions of a second PAwR train. A first central device 702 may be the same as or similar to one or more of the first central device 502 of FIG. 5 and/or the first central device 602 of FIG. 6. A second central device 704 may be the same as or similar to one or more of the second central device 504 of FIG. 5 and/or the second central device 604 of FIG. 6. A bridge peripheral device 705 may be the same as or similar to one or more of the bridge peripheral device 505 of FIG. 5 and/or the bridge peripheral device 605 of FIG. 6.

A first time window 710 may be the same as or similar to the time window 510 of FIG. 5. A second time window 730 may be the same as or similar to the time window 530 of FIG. 5. In first time window 710, a Tx subframe slot 712 associated with a transmission from first central device 702 to bridge peripheral device 705 on a first PAwR train can be the same as or similar to the Tx subframe slot 512 of FIG. 5. Within first time window 710, an Rx subframe slot 715 associated with a reception by bridge peripheral device 705 from first central device 702 can be the same as the Tx subframe slot 712. The Rx subframe slot 715 may additionally be the same as or similar to the Rx subframe slot 515 of FIG. 5.

Within second time window 730, a Tx subframe slot 734 associated with a transmission from second central device 704 to bridge peripheral device 7045 on a second PAwR train can be the same as or similar to the Tx subframe slot 534 of FIG. 5. In one illustrative example, the Tx subframe slot 734 can be the same as the subframe slot allocated to bridge peripheral device 605 by second central device 604 at blocks 660-664 of FIG. 6. The Tx subframe slot 734 of the second PAwR train can be the same as an Rx subframe slot 735 associated with a reception by bridge peripheral device 705 of the message transmitted by second central device 704 at the Tx subframe slot 734.

As noted previously, the first PAwR train Tx subframe slot 712/Rx subframe slot 715 of first time window 710 (e.g., a first PAwR subframe) can initially be separated from the second PAwR train Tx subframe slot 734/Rx subframe slot 735 of second time window 730 (e.g., a second PAwR subframe), based on the second central device 704 using the timing difference information to allocate the first PAwR train Tx subframe slot 734/Rx subframe slot 735 to be separate (e.g., different) from the first PAwR train Tx subframe slot 712/Rx subframe slot 715.

Over time, the first and second PAwR trains may drift independently from one another, for example based on the first and second PAwR trains not being synchronized with one another and their respective clocks drifting relative to one another. For example, an oscillator included in or associated with first central device 702 may be used to control timing of the first PAwR train (e.g., including the Tx subframe slot 712 and Rx subframe slot 715 associated with bridge 705) may drift relative to an oscillator included in or associated with second central device 704 and used to control timing of the second PAwR train (e.g., including the Tx subframe slot 734 and the Rx subframe slot 715 associated with bridge 705). For instance, as illustrated in FIG. 7, drift between the first and second PAwR trains may cause the first PAwR train slots 712, 715 of bridge 705 to drift later in time (e.g., to the right), closer to the second PAwR train slots 734, 735 of bridge 705. Additionally, the second PAwR train slots 734, 735 of bridge 705 may drift earlier in time (e.g., to the left), closer to the first PAwR train slots 712, 715 of bridge 705.

In some cases, the first PAwR train slots 712, 715 of bridge 705 may eventually overlap, conflict, and/or collide with the second PAwR train slots 734, 735 of bridge 705. In some aspects, the clock (e.g., oscillator) drift between first and second PAwR trains may be relatively small, and the drift between the first and second PAwR trains may be relatively slow or gradual. In some examples, the bridge peripheral device 705 may miss synchronization signals (e.g., AP Sync commands) from at least one of the first and second PAwR trains when the timings overlap for multiple subframes or frames (e.g., when the timings of first PAwR train slots 712, 715 overlap with the timings of second PAwR train slots 734, 745 for multiple subframes or frames). Overlapping timings can be associated with loss of synchronization between the bridge peripheral device 705 and one or more (or both) of the first central device 702 and the second central device 704.

In one illustrative example, the bridge peripheral device 705 can monitor the timing difference between the first central device 702 and second central device 704, and may send a message to one or more of the first central device 702 and/or second central device 704 indicative of the timing difference exceeding (or falling below) a threshold value. Based on the timing difference exceeding (or falling below) the threshold value, the central device(s) can update the respective subframe slot for the bridge peripheral device 705 by reallocating a different subframe slot that is separated from (e.g., non-overlapping with) the other central device's subframe slot.

Figure 8:
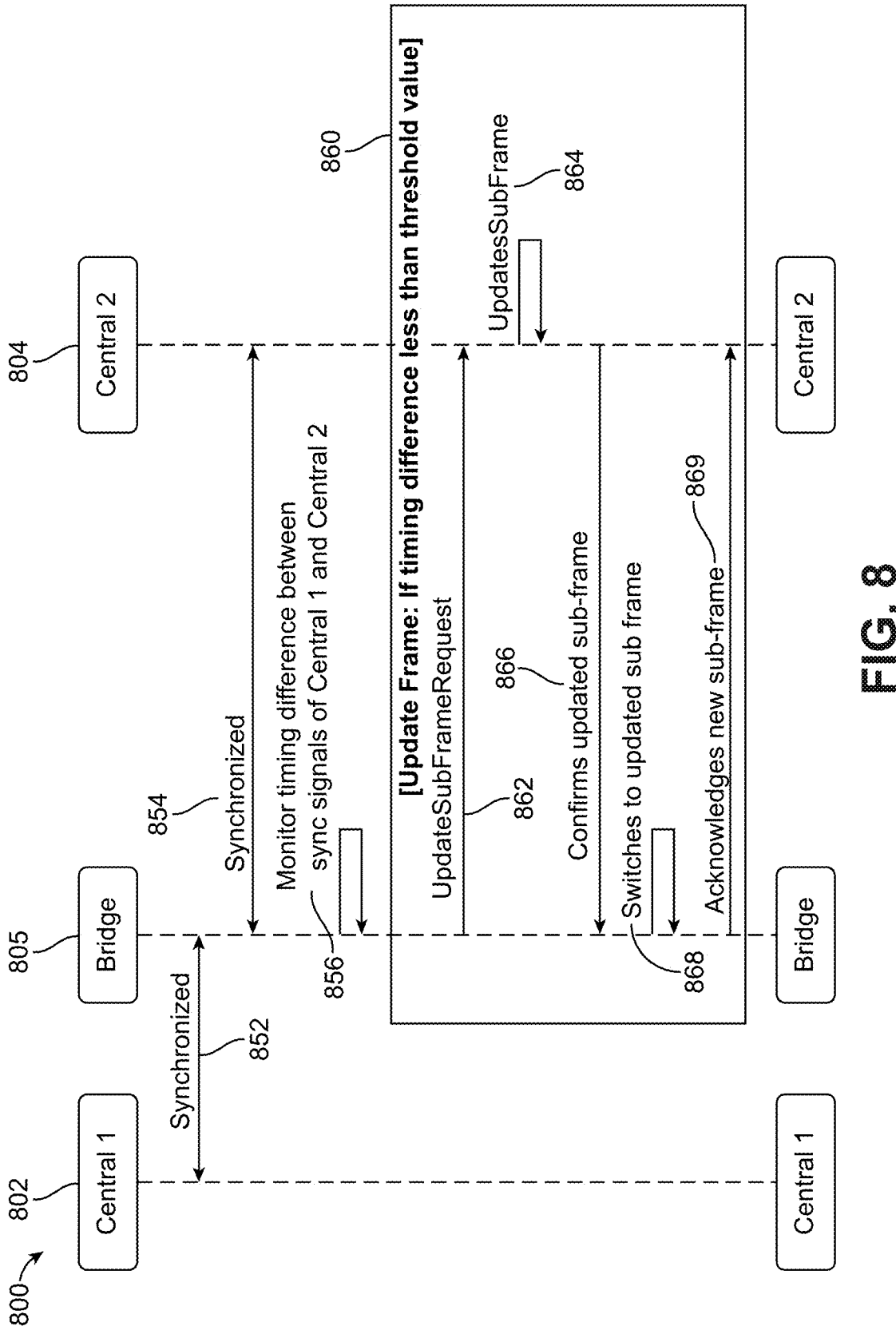
FIG. 8 is a signaling diagram illustrating an example of subframe reallocation that may be performed to update a subframe associated with PA transmissions between a central device and a peripheral device configured as a bridge for the central device, in accordance with some examples.

For example, FIG. 8 is a signaling diagram illustrating an example of a subframe reallocation process 800 that may be performed to update a subframe associated with PA transmissions between a central device and a peripheral device configured as a bridge for the central device, in accordance with some examples. A first central device 802 may be the same as or similar to one or more of the first central device 502 of FIG. 5, the first central device 602 of FIG. 6, and/or the first central device 702 of FIG. 7. A second central device 804 may be the same as or similar to one or more of the second central device 504 of FIG. 5, the second central device 604 of FIG. 6, and/or the second central device 704 of FIG. 7. A bridge peripheral device 805 may be the same as or similar to one or more of the bridge peripheral device 505 of FIG. 5, the bridge peripheral device 605 of FIG. 6, and/or the bridge peripheral device 705 of FIG. 7.

At block 852, the first central device 802 and the bridge peripheral device 805 establish synchronization. At block 854, the second central device 804 and the bridge peripheral device 805 establish synchronization. For instance, in one illustrative example, block 854 can include one or more (or all) of blocks 652-664 of the synchronization process 600 of FIG. 6.

At block 856, the bridge peripheral device 805 can monitor a timing difference between respective synchronization signals corresponding to the first central device 802 and the second central device 804. For instance, bridge peripheral device 805 can continuously or periodically determine timing difference information indicative of a difference between a first AP Sync command associated with first central device 802 and a second AP Sync command associated with second central device 804. In one illustrative example, bridge peripheral device 805 can determine the timing difference information the same as or similar to that described above with respect to the timing difference information determined at block 656 of FIG. 6.

In some aspects, at block 856 the bridge peripheral device 805 may additionally compare the determined timing difference information to one or more threshold values. For example, the threshold value can be indicative of a minimum timing difference between the first synchronization signal (e.g., first AP Sync command) associated with the first PAwR train of bridge 805 and the second synchronization signal (e.g., second AP Sync command) associated with the second PAwR train of bridge 805. The threshold value can be given in units of time (e.g., seconds, milliseconds, microseconds, etc.) and/or can be given in units of subframes and/or subframe slots.

In one illustrative example, if the bridge peripheral device 805 determines that the timing difference determined at block 856 is less than the threshold difference value, the bridge peripheral device can initiate a subframe update process 860 at one or more (or both) of the central devices 802, 804.

For instance, bridge peripheral device 805 can send a message indicative of a request to update (e.g., reallocate) the subframe for bridge peripheral device 805 on a particular PAwR train (e.g., the first or second PAwR train) to the central device corresponding to the particular PAwR train (e.g., first central device 802 or second central device 804). In one illustrative example, the message (e.g., the message sent by bridge peripheral device 805) can be further indicative of the timing difference currently observed between the respective sync signals corresponding to the first central device and the second central device 804. In some examples, bridge peripheral device 805 can send a first subframe update request message to cause the first central device 802 to update (e.g., reallocate) the subframe slot for bridge 805 on the first PAwR train and can send a second subframe update request message to cause the second central device 804 to update (e.g., reallocate) the subframe slot for bridge 805 on the second PAwR train.

In the example of FIG. 8, at block 862, the bridge peripheral device 805 can transmit an UpdateSubFrameRequest message indicative of a request for the second central device 804 to update (e.g., reallocate) the subframe slot for bridge peripheral device 805 on the second PAwR train.

At block 864, second central device 804 can update (e.g., reallocate) the subframe slot associated with PA communications between second central device 804 and bridge 805. For instance, second central device 804 can update (e.g., reallocate) the subframe slot for bridge 805 on the second PAwR train in a manner the same as or similar to that described above with respect to the initial subframe slot allocation performed at block 660 of FIG. 6. In some aspects, the second central device 804 can update (e.g., reallocate) the subframe slot for bridge 805 on the second PAwR train based on the UpdateSubFrameRequest message further being indicative of the current timing difference information determined at block 856. The second central device 804 can determine an updated or reallocated subframe slot that is as far as necessary from the first central device 802's subframe allocation for bridge 805 on the first PAwR train.

At block 866, the second central device 804 can confirm the updated sub-frame to the bridge 805. For instance, second central device 804 can transmit a message to bridge 805 indicative of the updated (e.g., reallocated) subframe slot that is to be used by bridge 805 and second central deice 804 for PA communications on the second PAwR train.

At block 868, the bridge peripheral device 805 can switch to utilizing the updated subframe slot allocated at blocks 864 and 866. For instance, bridge 805 can switch to using the updated subframe slot indicated in the confirmation of the updated subframe slot at block 866. Based on bridge 805 switching to using the updated subframe slot at block 868, bridge peripheral device 805 can perform central-to-central communication relaying (e.g., bridging), based on the updated subframe slot for bridge 805 on the second PAwR train being separated in time (e.g., non-overlapping with) the subframe slot for bridge 805 on the first PAwR train. The subframe slot for bridge 805 on the first PAwR train (e.g., associated with the first central device 802) may remain un-updated, or may be updated (e.g., reallocated) using a process the same as the subframe update process 860 described above with respect to the second PAwR train (e.g., associated with the second central device 804).

At block 869, the bridge peripheral device 805 can transmit an acknowledgement to second central device 804, acknowledging the updated sub-frame. For instance, the acknowledgement of block 869 can be an acknowledgement that the bridge 805 receives the updated subframe slot confirmation message at block 866 and/or can be an acknowledgement that bridge 805 implements the updated subframe slot at block 868.

FIG. 9 is a flow chart illustrating an example of a process 900 for wireless communications. The process 900 can be performed by a wireless communication device (e.g., such as an electronic shelf label (ESL) device, a rail controller, an active BLE tracker, a PAwR peripheral device, etc.) or by a component or system (e.g., a chipset) thereof. The operations of the process 900 may be implemented as software components that are executed and run on one or more processors (e.g., processor 1110 of FIG. 11 or other processor(s)). Further, the transmission and reception of signals by the wireless communications device in the process 900 may be enabled, for example, by one or more antennas and/or one or more transceivers (e.g., wireless transceiver(s)).

At block 902, the process 900 includes receiving, from a first network entity, a request to identify one or more additional network entities available for communication with a wireless communication device. For instance, the first network entity can include one or more of central 502 of FIG. 5, central 602 of FIG. 6, central 702 of FIG. 7, and/or central 802 of FIG. 8. In some cases, the wireless communication device is an electronic shelf label (ESL). For instance, the wireless communication device can be the same as or similar to one or more of the ESLs of FIGS. 1-4, the peripheral 505 of FIG. 5, the peripheral 605 of FIG. 6, the peripheral 705 of FIG. 7, and/or the peripheral 805 of FIG. 8.

In some cases, the request to determine the one or more additional network entities is included in a bridge request from the first network entity. In some examples, the wireless communication device is synchronized with a first PA train associated with the first network entity. In some examples, the first network entity is a first access point (AP) associated with the wireless communication device. A second network entity can be a second AP associated with the wireless communication device.

At block 904, the process 900 includes transmitting, to a second network entity included in the one or more additional network entities, timing information indicative of a difference between first synchronization information associated with the first network entity and second synchronization information associated with the second network entity. For instance, transmitting timing information can be the same as or similar to the transmitting the joining request with timing difference information of block 658 of FIG. 6. In some examples, the second network entity can include one or more of central 504 of FIG. 5, central 604 of FIG. 6, central 704 of FIG. 7, and/or central 804 of FIG. 8.

In some cases, transmitting the timing information includes transmitting, to the second network entity, a joining request associated with a PA train of the second network entity, wherein the joining request includes the timing information, wherein the joining request is transmitted using a default group or a recommended group for the second network entity. For instance, the joining request can be the same as or similar to the joining request associated with block 658 of FIG. 6. In some cases, the timing information can be the same as or similar to the timing difference calculated at block 656 of FIG. 6.

In some cases, the wireless communication device can receive the second synchronization information from the second network entity based on scanning for a respective synchronization information associated with each respective additional network entity of the one or more additional network entities. For instance, the scanning can be the same as or similar to that of block 654 of FIG. 6. In some cases, the wireless communication device can determine the first synchronization information based on a first synchronization signal received from the first network entity and can determine the second synchronization information based on a second synchronization signal received from the second network entity.

In some examples, the first synchronization signal is a first access point (AP) Sync command received from the first network entity and corresponding to a first PA train associated with the first network entity, and the second synchronization signal is a second AP Sync command received from the second network entity and corresponding to a second PA train associated with the second network entity.

At block 906, the process 900 includes receiving, from the second network entity, subframe allocation information corresponding to periodic advertisements (PAs) between the second network entity and the wireless communication device. For example, in some cases, the wireless communication device can receive, from the second network entity, a joining response corresponding to the joining request, wherein the joining response is indicative of the subframe allocation information. For instance, the joining response can be the same as or similar to the joining response associated with block 662 of FIG. 6.

At block 908, the process 900 includes receiving, from the second network entity, a PA based on the subframe allocation information. For instance, to receive the PA based on the subframe allocation information, the wireless communication device can synchronize with the second network entity based on the second synchronization information and the subframe allocation information. In some cases, the wireless communication device can receive the PA from the second network entity using a synchronized subframe slot determined based on the subframe allocation information (e.g., the calculated subframe allocation associated with blocks 660, 662, and/or 664 nof FIG. 6). In some examples, the subframe allocation information includes one or more of the synchronized subframe slot or a device identifier corresponding to the subframe allocation information.

In some examples, the PA is included in a PA train associated with the second network entity and the wireless communication device. In some cases, the subframe allocation information is indicative of a synchronized subframe slot associated with communication between the wireless communication device and the second network entity using the PA train. In some examples, the wireless communication device is configured to receive the PA from the second network entity using the synchronized subframe slot and the PA train.

In some cases, the wireless communication device is configured to receive the PA from the second network entity using a subframe slot based on the subframe allocation information, and transmit the PA to the first network entity using a first subframe slot different from the subframe slot based on the subframe allocation information. In some examples, the first subframe slot is associated with a first PA train corresponding to the first network entity, and the subframe slot based on the subframe allocation information is associated with a second PA train corresponding to the second network entity.

In some examples, the first subframe slot is associated with a first periodic advertisement with response (PAwR) train corresponding to the first network entity, and the subframe slot based on the subframe allocation information is associated with a second PAwR train corresponding to the second network entity.

In some cases, the wireless communication device can receive the request from the first network entity using the first subframe slot within a first PA frame associated with the first network entity, and can transmit, to the first network entity and using a response slot within the first subframe, the PA received from the second network entity.

In some cases, the process 900 can include determining updated timing information indicative of an updated difference between updated first synchronization information associated with the first network entity and updated second synchronization information associated with the second network entity. The wireless communication device can compare the updated timing information to a threshold value associated with a bridge configuration of the wireless communication device.

In some examples, the wireless communication device can transmit, to the second network entity, a request to update a subframe slot allocated to the wireless communication device based on a determination the updated timing information is less than the threshold value. The wireless communication device can receive, from the second network entity, updated subframe allocation information indicative of an updated subframe slot corresponding to PAs between the second network entity and the wireless communication device.

In some examples, the wireless communication device can receive, from the second network entity, an additional PA using the updated subframe slot.

FIG. 10 is a flow chart illustrating an example of a process 1000 for wireless communications. The process 1000 can be performed by a network entity (e.g., such as an access point, PAwR central device, etc.) and/or a network device (e.g., such as an AP) or by a component or system (e.g., a chipset) thereof. The operations of the process 1000 may be implemented as software components that are executed and run on one or more processors (e.g., processor 1110 of FIG. 11 or other processor(s)). Further, the transmission and reception of signals by the network entity in the process 1000 may be enabled, for example, by one or more antennas and/or one or more transceivers (e.g., wireless transceiver(s)).

At block 1002, the process 1000 includes receiving, from a wireless communication device, timing information indicative of a difference between first synchronization information associated with a first network entity and second synchronization information associated with the network entity.

In some examples, the network entity can include one or more of central 504 of FIG. 5, central 604 of FIG. 6, central 704 of FIG. 7, and/or central 804 of FIG. 8. In some examples, the first network entity can include one or more of central 502 of FIG. 5, central 602 of FIG. 6, central 702 of FIG. 7, and/or central 802 of FIG. 8. In some cases, the wireless communication device is an electronic shelf label (ESL). For instance, the wireless communication device can be the same as or similar to one or more of the ESLs of FIGS. 1-4, the peripheral 505 of FIG. 5, the peripheral 605 of FIG. 6, the peripheral 705 of FIG. 7, and/or the peripheral 805 of FIG. 8.

In some cases, receiving the timing information from the wireless communication device is based on receiving a bridge request. In some cases, receiving the timing information from the wireless communication device is based on receiving a request from the first network entity to the wireless communication device to identify one or more additional network entities associated with the wireless communication device.

At block 1004, the process 1000 includes transmitting, to the wireless communication device, subframe allocation information corresponding to periodic advertisements (PAs) between the network entity and the wireless communication device.

At block 1006, the process 1000 includes transmitting, to the wireless communication device, a PA based on the subframe allocation information. In some examples, the network entity can transmit the PA using a subframe slot based on the subframe allocation information, wherein the subframe slot is different from a first subframe slot associated with receiving the PA at the first network entity and from the wireless communication device.

In some examples, the subframe slot based on the subframe allocation information is associated with a PA train corresponding to the network entity, and wherein the PA train corresponding to the network entity is different from a first PA train corresponding to the first network entity.

In some examples, the network entity can receive, from the wireless communication device, a request to update a subframe slot allocated to the wireless communication device based on a determination updated timing information between the network entity and the first network entity is less than a threshold value. For instance, the network entity can transmit, to the wireless communication device, updated subframe allocation information indicative of an updated subframe slot corresponding to PAs between the network entity and the wireless communication device. In some examples, the network entity can transmit, to the wireless communication device, an additional PA using the updated subframe slot.

The network entity, network device, and/or the wireless communication device may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 900 of FIG. 9 and/or the process 1000 of FIG. 10 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 900 and 1000 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900, 1000, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
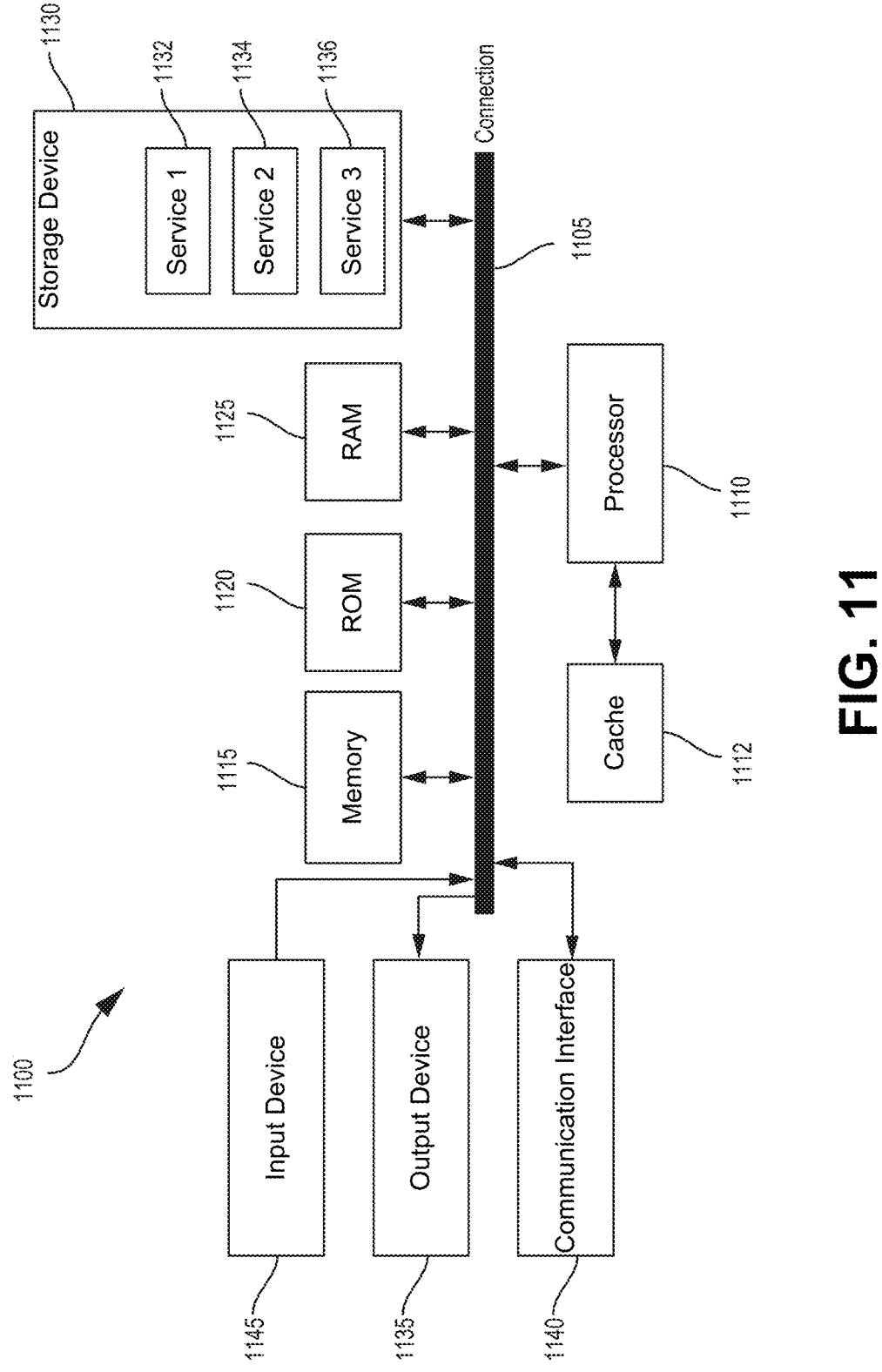
FIG. 11 is a block diagram illustrating an example of a computing system, which may be employed by the disclosed systems and techniques, in accordance with some examples.

FIG. 11 is a block diagram illustrating an example of a computing system 1100, which may be employed by the disclosed systems and techniques. In particular, FIG. 11 illustrates an example of computing system 1100, which can be, for example, any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that communicatively couples various system components including system memory 1115, such as read-only memory (ROM) 1120 and random-access memory (RAM) 1125 to processor 1110. Computing system 1100 can include a cache 1112 of high-speed memory connected directly with, in close proximity to, or integrated as part of processor 1110.

Processor 1110 can include any general-purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100.

Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more range sensors (e.g., LIDAR sensors, laser range finders, RF radars, ultrasonic sensors, and infrared (IR) sensors) configured to collect data and provide measurements to processor 1110, whereby processor 1110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A wireless communication device for wireless communications, the wireless communication device comprising: at least one memory; and at least one processor coupled to the at least one memory and configured to: receive, from a first network entity, a request to identify one or more additional network entities available for communication with the wireless communication device; transmit, to a second network entity included in the one or more additional network entities, timing information indicative of a difference between first synchronization information associated with the first network entity and second synchronization information associated with the second network entity; receive, from the second network entity, subframe allocation information corresponding to periodic advertisements (PAs) between the second network entity and the wireless communication device; and receive, from the second network entity, a PA based on the subframe allocation information.

Aspect 2. The wireless communication device of Aspect 1, wherein the at least one processor is further configured to: transmit, to the first network entity, the PA received from the second network entity.

Aspect 3. The wireless communication device of any of Aspects 1 to 2, wherein the at least one processor is configured to: receive the PA from the second network entity using a subframe slot based on the subframe allocation information; and transmit the PA to the first network entity using a first subframe slot different from the subframe slot based on the subframe allocation information.

Aspect 4. The wireless communication device of any of Aspects 2 to 3, wherein: the first subframe slot is associated with a first PA train corresponding to the first network entity; and the subframe slot based on the subframe allocation information is associated with a second PA train corresponding to the second network entity.

Aspect 5. The wireless communication device of any of Aspects 2 to 4, wherein: the first subframe slot is associated with a first periodic advertisement with response (PAwR) train corresponding to the first network entity; and the subframe slot based on the subframe allocation information is associated with a second PAwR train corresponding to the second network entity.

Aspect 6. The wireless communication device of any of Aspects 2 to 5, wherein the at least one processor is configured to: receive the request from the first network entity using the first subframe slot within a first PA frame associated with the first network entity; and transmit, to the first network entity and using a response slot within the first subframe, the PA received from the second network entity.

Aspect 7. The wireless communication device of any of Aspects 1 to 6, wherein the request to determine the one or more additional network entities is included in a bridge request from the first network entity.

Aspect 8. The wireless communication device of any of Aspects 1 to 7, wherein the at least one processor is further configured to: determine updated timing information indicative of an updated difference between updated first synchronization information associated with the first network entity and updated second synchronization information associated with the second network entity; and compare the updated timing information to a threshold value associated with a bridge configuration of the wireless communication device.

Aspect 9. The wireless communication device of Aspect 8, wherein the at least one processor is further configured to: transmit, to the second network entity, a request to update a subframe slot allocated to the wireless communication device based on a determination the updated timing information is less than the threshold value; and receive, from the second network entity, updated subframe allocation information indicative of an updated subframe slot corresponding to PAs between the second network entity and the wireless communication device.

Aspect 10. The wireless communication device of Aspect 9, wherein the at least one processor is further configured to: receive, from the second network entity, an additional PA using the updated subframe slot.

Aspect 11. The wireless communication device of any of Aspects 1 to 10, wherein, to receive the PA based on the subframe allocation information, the at least one processor is configured to: synchronize with the second network entity based on the second synchronization information and the subframe allocation information; and receive the PA from the second network entity using a synchronized subframe slot determined based on the subframe allocation information.

Aspect 12. The wireless communication device of Aspect 11, wherein the subframe allocation information includes one or more of the synchronized subframe slot or a device identifier corresponding to the subframe allocation information.

Aspect 13. The wireless communication device of any of Aspects 1 to 12, wherein, to transmit the timing information, the at least one processor is configured to: transmit, to the second network entity, a joining request associated with a PA train of the second network entity, wherein the joining request includes the timing information, wherein the joining request is transmitted using a default group or a recommended group for the second network entity.

Aspect 14. The wireless communication device of Aspect 13, wherein, to receive the subframe allocation information, the at least one processor is configured to: receive, from the second network entity, a joining response corresponding to the joining request, wherein the joining response is indicative of the subframe allocation information.

Aspect 15. The wireless communication device of any of Aspects 1 to 14, wherein: the PA is included in a PA train associated with the second network entity and the wireless communication device; the subframe allocation information is indicative of a synchronized subframe slot associated with communication between the wireless communication device and the second network entity using the PA train; and the at least one processor is configured to receive the PA from the second network entity using the synchronized subframe slot and the PA train.

Aspect 16. The wireless communication device of any of Aspects 1 to 15, wherein the at least one processor is configured to: receive the second synchronization information from the second network entity based on scanning for a respective synchronization information associated with each respective additional network entity of the one or more additional network entities Aspect 17. The wireless communication device of any of Aspects 1 to 16, wherein the wireless communication device is synchronized with a first PA train associated with the first network entity.

Aspect 18. The wireless communication device of any of Aspects 1 to 17, wherein the at least one processor is configured to: determine the first synchronization information based on a first synchronization signal received from the first network entity; and determine the second synchronization information based on a second synchronization signal received from the second network entity.

Aspect 19. The wireless communication device of any of Aspects 17 to 18, wherein: the first synchronization signal is a first access point (AP) Sync command received from the first network entity and corresponding to a first PA train associated with the first network entity; and the second synchronization signal is a second AP Sync command received from the second network entity and corresponding to a second PA train associated with the second network entity.

Aspect 20. The wireless communication device of any of Aspects 1 to 19, wherein the first network entity is a first access point (AP) associated with the wireless communication device, and wherein the second network entity is a second AP associated with the wireless communication device.

Aspect 21. The wireless communication device of any of Aspects 1 to 20, wherein the wireless communication device is an electronic shelf label (ESL).

Aspect 22. A network entity for wireless communications, the network entity comprising: at least one memory; and at least one processor coupled to the at least one memory and configured to: receive, from a wireless communication device, timing information indicative of a difference between first synchronization information associated with a first network entity and second synchronization information associated with the network entity; transmit, to the wireless communication device, subframe allocation information corresponding to periodic advertisements (PAs) between the network entity and the wireless communication device; and transmit, to the wireless communication device, a PA based on the subframe allocation information.

Aspect 23. The network entity of Aspect 22, wherein the at least one processor is configured to: transmit the PA using a subframe slot based on the subframe allocation information, wherein the subframe slot is different from a first subframe slot associated with receiving the PA at the first network entity and from the wireless communication device.

Aspect 24. The network entity of Aspect 23, wherein the subframe slot based on the subframe allocation information is associated with a PA train corresponding to the network entity, and wherein the PA train corresponding to the network entity is different from a first PA train corresponding to the first network entity.

Aspect 25. The network entity of any of Aspects 22 to 24, wherein the at least one processor is configured to: receive the timing information from the wireless communication device based on a request from the first network entity to the wireless communication device to identify one or more additional network entities associated with the wireless communication device.

Aspect 26. The network entity of any of Aspects 22 to 25, wherein the at least one processor is configured to: receive the timing information from the wireless communication device based on a bridge request.

Aspect 27. The network entity of any of Aspects 22 to 26, wherein the at least one processor is further configured to: receive, from the wireless communication device, a request to update a subframe slot allocated to the wireless communication device based on a determination updated timing information between the network entity and the first network entity is less than a threshold value; and transmit, to the wireless communication device, updated subframe allocation information indicative of an updated subframe slot corresponding to PAs between the network entity and the wireless communication device.

Aspect 28. The network entity of Aspect 27, wherein the at least one processor is further configured to: transmit, to the wireless communication device, an additional PA using the updated subframe slot.

Aspect 29. A method for wireless communications by a wireless communication device, the method comprising: receiving, from a first network entity, a request to identify one or more additional network entities available for communication with the wireless communication device; transmitting, to a second network entity included in the one or more additional network entities, timing information indicative of a difference between first synchronization information associated with the first network entity and second synchronization information associated with the second network entity; receiving, from the second network entity, subframe allocation information corresponding to periodic advertisements (PAs) between the second network entity and the wireless communication device; and receiving, from the second network entity, a PA based on the subframe allocation information.

Aspect 30. A method for wireless communications by a network entity, the method comprising: receiving, from a wireless communication device, timing information indicative of a difference between first synchronization information associated with a first network entity and second synchronization information associated with the network entity; transmitting, to the wireless communication device, subframe allocation information corresponding to periodic advertisements (PAs) between the network entity and the wireless communication device;

and transmitting, to the wireless communication device, a PA based on the subframe allocation information.

Aspect 31. A non-transitory computer-readable storage medium comprising instructions stored thereon which, when executed by at least one processor, causes the at least one processor to perform operations according to any of Aspects 1 to 20.

Aspect 32. A non-transitory computer-readable storage medium comprising instructions stored thereon which, when executed by at least one processor, causes the at least one processor to perform operations according to any of Aspects 21 to 28.

Aspect 33. A non-transitory computer-readable storage medium comprising instructions stored thereon which, when executed by at least one processor, causes the at least one processor to perform operations according to Aspect 29.

Aspect 34. A non-transitory computer-readable storage medium comprising instructions stored thereon which, when executed by at least one processor, causes the at least one processor to perform operations according to Aspect 30.

Aspect 35. An apparatus comprising one or more means for performing operations according to any of Aspects 1 to 20.

Aspect 36. An apparatus comprising one or more means for performing operations according to any of Aspects 21 to 28.

Aspect 37. An apparatus comprising one or more means for performing operations according to Aspect 29.

Aspect 38. An apparatus comprising one or more means for performing operations according to Aspect 30.

What is claimed is:

1. A wireless communication device for wireless communications, the wireless communication device comprising:
   at least one memory; and
   at least one processor coupled to the at least one memory and configured to:
      receive, from a first network entity, a request to identify one or more additional network entities available for communication with the wireless communication device;
      transmit, to a second network entity included in the one or more additional network entities, timing information indicative of a difference between first synchronization information associated with the first network entity and second synchronization information associated with the second network entity;
      receive, from the second network entity, subframe allocation information corresponding to periodic advertisements (PAs) between the second network entity and the wireless communication device; and
      receive, from the second network entity, a PA based on the subframe allocation information.

2. The wireless communication device of claim 1, wherein the at least one processor is further configured to:
   transmit, to the first network entity, the PA received from the second network entity.

3. The wireless communication device of claim 1, wherein the at least one processor is configured to:
   receive the PA from the second network entity using a subframe slot based on the subframe allocation information; and
   transmit the PA to the first network entity using a first subframe slot different from the subframe slot based on the subframe allocation information.

4. The wireless communication device of claim 3, wherein:
   the first subframe slot is associated with a first PA train corresponding to the first network entity; and
   the subframe slot based on the subframe allocation information is associated with a second PA train corresponding to the second network entity.

5. The wireless communication device of claim 3, wherein:
   the first subframe slot is associated with a first periodic advertisement with response (PAwR) train corresponding to the first network entity; and
   the subframe slot based on the subframe allocation information is associated with a second PAwR train corresponding to the second network entity.

6. The wireless communication device of claim 3, wherein the at least one processor is configured to:
   receive the request from the first network entity using the first subframe slot within a first PA frame associated with the first network entity; and
   transmit, to the first network entity and using a response slot within the first subframe, the PA received from the second network entity.

7. The wireless communication device of claim 1, wherein the request to determine the one or more additional network entities is included in a bridge request from the first network entity.

8. The wireless communication device of claim 1, wherein the at least one processor is further configured to:
   determine updated timing information indicative of an updated difference between updated first synchronization information associated with the first network entity and updated second synchronization information associated with the second network entity; and
   compare the updated timing information to a threshold value associated with a bridge configuration of the wireless communication device.

9. The wireless communication device of claim 8, wherein the at least one processor is further configured to:
   transmit, to the second network entity, a request to update a subframe slot allocated to the wireless communication device based on a determination the updated timing information is less than the threshold value; and
   receive, from the second network entity, updated subframe allocation information indicative of an updated subframe slot corresponding to PAs between the second network entity and the wireless communication device.

10. The wireless communication device of claim 9, wherein the at least one processor is further configured to:
   receive, from the second network entity, an additional PA using the updated subframe slot.

11. The wireless communication device of claim 1, wherein, to receive the PA based on the subframe allocation information, the at least one processor is configured to:
   synchronize with the second network entity based on the second synchronization information and the subframe allocation information; and
   receive the PA from the second network entity using a synchronized subframe slot determined based on the subframe allocation information.

12. The wireless communication device of claim 11, wherein the subframe allocation information includes one or more of the synchronized subframe slot or a device identifier corresponding to the subframe allocation information.

13. The wireless communication device of claim 1, wherein, to transmit the timing information, the at least one processor is configured to:

US 12,628,138 B2

45

46 transmit, to the second network entity, a joining request associated with a PA train of the second network entity, wherein the joining request includes the timing information, wherein the joining request is transmitted using a default group or a recommended group for the second network entity.

14. The wireless communication device of claim 13, wherein, to receive the subframe allocation information, the at least one processor is configured to:

receive, from the second network entity, a joining response corresponding to the joining request, wherein the joining response is indicative of the subframe allocation information.

15. The wireless communication device of claim 1, wherein:

the PA is included in a PA train associated with the second network entity and the wireless communication device;

the subframe allocation information is indicative of a synchronized subframe slot associated with communication between the wireless communication device and the second network entity using the PA train; and the at least one processor is configured to receive the PA from the second network entity using the synchronized subframe slot and the PA train.

16. The wireless communication device of claim 1, wherein the at least one processor is configured to:

receive the second synchronization information from the second network entity based on scanning for a respective synchronization information associated with each respective additional network entity of the one or more additional network entities.

17. The wireless communication device of claim 1, wherein the wireless communication device is synchronized with a first PA train associated with the first network entity.

18. The wireless communication device of claim 1, wherein the at least one processor is configured to:

determine the first synchronization information based on a first synchronization signal received from the first network entity; and determine the second synchronization information based on a second synchronization signal received from the second network entity.

19. The wireless communication device of claim 17, wherein:

the first synchronization signal is a first access point (AP) Sync command received from the first network entity and corresponding to a first PA train associated with the first network entity; and the second synchronization signal is a second AP Sync command received from the second network entity and corresponding to a second PA train associated with the second network entity.

20. The wireless communication device of claim 1, wherein the first network entity is a first access point (AP) associated with the wireless communication device, and wherein the second network entity is a second AP associated with the wireless communication device.

21. The wireless communication device of claim 1, wherein the wireless communication device is an electronic shelf label (ESL).

22. A network entity for wireless communications, the network entity comprising:

at least one memory; and at least one processor coupled to the at least one memory and configured to:

receive, from a wireless communication device, timing information indicative of a difference between first synchronization information associated with a first network entity and second synchronization information associated with the network entity;

transmit, to the wireless communication device, subframe allocation information corresponding to periodic advertisements (PAs) between the network entity and the wireless communication device; and transmit, to the wireless communication device, a PA based on the subframe allocation information.

23. The network entity of claim 22, wherein the at least one processor is configured to:

transmit the PA using a subframe slot based on the subframe allocation information, wherein the subframe slot is different from a first subframe slot associated with receiving the PA at the first network entity and from the wireless communication device.

24. The network entity of claim 23, wherein the subframe slot based on the subframe allocation information is associated with a PA train corresponding to the network entity, and wherein the PA train corresponding to the network entity is different from a first PA train corresponding to the first network entity.

25. The network entity of claim 22, wherein the at least one processor is configured to:

receive the timing information from the wireless communication device based on a request from the first network entity to the wireless communication device to identify one or more additional network entities associated with the wireless communication device.

26. The network entity of claim 22, wherein the at least one processor is configured to:

receive the timing information from the wireless communication device based on a bridge request.

27. The network entity of claim 22, wherein the at least one processor is further configured to:

receive, from the wireless communication device, a request to update a subframe slot allocated to the wireless communication device based on a determination updated timing information between the network entity and the first network entity is less than a threshold value; and transmit, to the wireless communication device, updated subframe allocation information indicative of an updated subframe slot corresponding to PAs between the network entity and the wireless communication device.

28. The network entity of claim 27, wherein the at least one processor is further configured to:

transmit, to the wireless communication device, an additional PA using the updated subframe slot.

29. A method for wireless communications by a wireless communication device, the method comprising:

receiving, from a first network entity, a request to identify one or more additional network entities available for communication with the wireless communication device;

transmitting, to a second network entity included in the one or more additional network entities, timing information indicative of a difference between first synchronization information associated with the first network entity and second synchronization information associated with the second network entity;

receiving, from the second network entity, subframe allocation information corresponding to periodic advertisements (PAs) between the second network entity and the wireless communication device; and

US 12,628,138 B2

47 receiving, from the second network entity, a PA based on the subframe allocation information.

30. A method for wireless communications by a network entity, the method comprising:

receiving, from a wireless communication device, timing information indicative of a difference between first synchronization information associated with a first network entity and second synchronization information associated with the network entity;

transmitting, to the wireless communication device, subframe allocation information corresponding to periodic advertisements (PAs) between the network entity and the wireless communication device; and transmitting, to the wireless communication device, a PA based on the subframe allocation information.

* * * * *